(12) United States Patent
Clark et al.

(10) Patent No.: US 12,472,023 B2
(45) Date of Patent: Nov. 18, 2025

(54) SYSTEMS AND METHODS FOR A CONTROL STATION FOR ROBOTIC INTERVENTIONAL PROCEDURES USING A PLURALITY OF ELONGATED MEDICAL DEVICES

(71) Applicant: Corindus, Inc., Newton, MA (US)

(72) Inventors: Andrew Clark, Arlington, MA (US); Dino Kasvikis, Barrington, RI (US)

(73) Assignee: Siemens Healthineers Endovascular Robotics Inc., Newton, MA (US)

( * ) Notice: Subject to any disclaimer, the term of this patent is extended or adjusted under 35 U.S.C. 154(b) by 173 days.

(21) Appl. No.: 18/257,302

(22) PCT Filed: Jan. 14, 2021

(86) PCT No.: PCT/US2021/070030
§ 371 (c)(1),
(2) Date: Jun. 14, 2023

(87) PCT Pub. No.: WO2022/154975
PCT Pub. Date: Jul. 21, 2022

(65) Prior Publication Data
US 2024/0033024 A1    Feb. 1, 2024

(51) Int. Cl.
*A61B 34/37*    (2016.01)
*A61B 17/12*    (2006.01)
(Continued)

(52) U.S. Cl.
CPC ........ *A61B 34/37* (2016.02); *A61B 17/12022* (2013.01); *A61B 2034/301* (2016.02); *A61B 2034/303* (2016.02)

(58) Field of Classification Search
CPC .............. A61B 34/37; A61B 17/12022; A61B 2034/301; A61B 2034/303; A61B 34/25;
(Continued)

(56) References Cited

U.S. PATENT DOCUMENTS 3,821,525 A    6/1974    Eaton et al.
3,922,996 A    12/1975    Meyer
(Continued)

FOREIGN PATENT DOCUMENTS

CN    101427205    5/2009
CN    102124425    7/2011
(Continued)

OTHER PUBLICATIONS

International Search Report received for Corresponding PCT Application No. PCT/US2021/070030 received on May 20, 2021.
(Continued)

*Primary Examiner* — Harry Y Oh

(57) ABSTRACT

A system for controlling a robotic drive configured to move one or more elongated medical devices. The system may include a housing comprising a first surface and a second surface not co-planar with the first surface, a first control integrated with the first surface and manipulable by a first digit of a first hand of a user to select one of the one or more elongated medical devices, and a second control integrated with the second surface and manipulable by a second digit of the first hand of the user to instruct the robotic drive to move the selected elongated medical device in a first degree of freedom, wherein the first control and the second control are simultaneously manipulable by the first digit and the second digit.

40 Claims, 16 Drawing Sheets

(51) Int. Cl.
*A61B 17/22* (2006.01)
*A61B 17/3207* (2006.01)
*A61B 34/00* (2016.01)
*A61B 34/30* (2016.01)
*A61B 34/35* (2016.01)
*A61B 90/00* (2016.01)
*A61F 2/95* (2013.01)
*A61M 25/09* (2006.01)

(58) Field of Classification Search
CPC ........ A61B 2034/742; A61B 2090/376; A61B 2090/3762; A61B 2090/378; A61B 34/35; A61B 34/30; A61B 17/22; A61B 17/3207; A61B 34/70; A61B 2017/1205; A61B 2017/22079; A61F 2/95; A61F 2002/9528; A61M 25/09; A61M 2025/09116
See application file for complete search history.

(56) References Cited

U.S. PATENT DOCUMENTS

| | | | |
|---|---|---|---|
| 4,706,671 A | 11/1987 | Weinrib | |
| 4,926,858 A | 5/1990 | Gifford et al. | |
| 5,217,474 A | 6/1993 | Zacca et al. | |
| 5,312,338 A | 5/1994 | Nelson et al. | |
| 5,350,101 A | 9/1994 | Godlewski | |
| 5,527,279 A | 6/1996 | Imran | |
| 5,854,622 A | 12/1998 | Brannon | |
| 5,907,487 A | 5/1999 | Rosenberg et al. | |
| 6,590,171 B1 | 7/2003 | Wolf et al. | |
| 6,642,686 B1 | 11/2003 | Ruch | |
| 6,793,653 B2 | 9/2004 | Sanchez et al. | |
| 7,331,967 B2 | 2/2008 | Lee et al. | |
| 7,766,856 B2 | 8/2010 | Ferry et al. | |
| 7,766,894 B2 | 8/2010 | Weitzner et al. | |
| 7,806,891 B2 | 10/2010 | Nowlin et al. | |
| 7,819,884 B2 | 10/2010 | Lee et al. | |
| 7,865,266 B2 | 1/2011 | Moll et al. | |
| 7,972,298 B2 | 7/2011 | Wallace et al. | |
| 7,974,681 B2 | 7/2011 | Wallace et al. | |
| 8,002,767 B2 | 8/2011 | Sanchez et al. | |
| 8,005,537 B2 | 8/2011 | Hlavka et al. | |
| 8,052,636 B2 | 11/2011 | Moll et al. | |
| 8,092,397 B2 | 1/2012 | Wallace et al. | |
| 8,175,677 B2 | 5/2012 | Sayler et al. | |
| 8,332,072 B1 | 12/2012 | Schaible et al. | |
| 8,343,096 B2 | 1/2013 | Kirschenman et al. | |
| 8,390,438 B2 | 3/2013 | Olson et al. | |
| 8,515,576 B2 | 8/2013 | Lipow et al. | |
| 8,594,799 B2 | 11/2013 | Haller et al. | |
| 8,600,551 B2 | 12/2013 | Itkowitz et al. | |
| 8,617,102 B2 | 12/2013 | Moll et al. | |
| 8,684,952 B2 | 4/2014 | Weitzner et al. | |
| 8,736,212 B2 | 5/2014 | Sandhu et al. | |
| 8,740,840 B2 | 6/2014 | Foley et al. | |
| 8,801,661 B2 | 8/2014 | Moll et al. | |
| 8,939,891 B2 | 1/2015 | Sanchez et al. | |
| 9,131,986 B2 | 9/2015 | Greer et al. | |
| 9,161,817 B2 | 10/2015 | Olson et al. | |
| 9,179,832 B2 | 11/2015 | Diolaiti | |
| 9,241,768 B2 | 1/2016 | Sandhu et al. | |
| 9,283,046 B2 | 3/2016 | Walker et al. | |
| 9,301,811 B2 | 4/2016 | Goldberg et al. | |
| 9,320,479 B2 | 4/2016 | Wenderow et al. | |
| 9,326,822 B2 | 5/2016 | Lewis et al. | |
| 9,408,669 B2 | 8/2016 | Kokish et al. | |
| 9,474,580 B2 | 10/2016 | Hannaford et al. | |
| 9,532,840 B2 | 1/2017 | Wong et al. | |
| 9,763,739 B2 | 9/2017 | Schaible et al. | |
| 9,782,564 B2 | 10/2017 | Zirps et al. | |
| 9,814,536 B2 | 11/2017 | Goldberg et al. | |
| 9,814,864 B2 | 11/2017 | Scarpine et al. | |
| 9,825,455 B2 | 11/2017 | Sandhu et al. | |
| 9,833,294 B2 | 12/2017 | Franjic et al. | |
| 9,848,954 B2 | 12/2017 | Barnett | |
| 9,872,605 B2 | 1/2018 | Doyle | |
| 10,028,794 B2 | 7/2018 | Cagle et al. | |
| 10,039,605 B2 | 8/2018 | Kostrzewski et al. | |
| 10,052,164 B2 | 8/2018 | Overmyer | |
| 10,052,165 B2 | 8/2018 | Cohen et al. | |
| 10,085,810 B2 | 10/2018 | Vakharia et al. | |
| 10,136,954 B2 | 11/2018 | Johnson et al. | |
| 10,166,061 B2 | 1/2019 | Berry et al. | |
| 10,213,264 B2 | 2/2019 | Tanner et al. | |
| 10,238,457 B2 | 3/2019 | Herrell et al. | |
| 10,251,716 B2 | 4/2019 | Overmyer | |
| 10,292,777 B1 | 5/2019 | Adelman | |
| 10,307,214 B2 | 6/2019 | Lathrop et al. | |
| 10,342,411 B2 | 7/2019 | Jasperson et al. | |
| 10,405,934 B2 | 9/2019 | Prisco et al. | |
| 10,413,374 B2 | 9/2019 | Chassot et al. | |
| 10,463,440 B2 | 11/2019 | Bowling et al. | |
| 10,499,795 B2 | 12/2019 | Ogawa et al. | |
| 10,512,515 B2 | 12/2019 | Bailey | |
| 10,532,466 B2 | 1/2020 | Schaible et al. | |
| 10,548,675 B2 | 2/2020 | Kang et al. | |
| 10,568,707 B2 | 2/2020 | Schaible et al. | |
| 10,599,233 B1* | 3/2020 | Amalou | G06F 3/0346 |
| 10,610,310 B2 | 4/2020 | Todd et al. | |
| 10,646,291 B2 | 5/2020 | Turner | |
| 10,653,486 B2 | 5/2020 | Ishihara et al. | |
| 10,660,717 B2 | 5/2020 | Sartor | |
| 10,675,110 B2 | 6/2020 | Farritor et al. | |
| 10,682,191 B2 | 6/2020 | Hourtash et al. | |
| 2002/0177789 A1 | 11/2002 | Ferry et al. | |
| 2004/0011154 A1 | 1/2004 | Dybro | |
| 2004/0147934 A1 | 7/2004 | Kiester | |
| 2004/0254566 A1 | 12/2004 | Plicchi et al. | |
| 2005/0119615 A1 | 6/2005 | Noriega | |
| 2005/0197701 A1 | 9/2005 | Steinberg | |
| 2006/0074442 A1 | 4/2006 | Noriega | |
| 2006/0243080 A1 | 11/2006 | Takamoto | |
| 2007/0060879 A1 | 3/2007 | Weitzner et al. | |
| 2007/0100254 A1 | 5/2007 | Murakami et al. | |
| 2008/0161801 A1 | 7/2008 | Steinke | |
| 2008/0243064 A1 | 10/2008 | Stahler et al. | |
| 2009/0082722 A1 | 3/2009 | Munger et al. | |
| 2009/0213073 A1 | 8/2009 | Obermeyer et al. | |
| 2009/0248042 A1 | 10/2009 | Kirschenman | |
| 2010/0010505 A1 | 1/2010 | Herlihy | |
| 2010/0175701 A1 | 7/2010 | Reis | |
| 2010/0274087 A1 | 10/2010 | Diolaiti | |
| 2011/0015569 A1 | 1/2011 | Kirschenman et al. | |
| 2011/0237880 A1 | 9/2011 | Hamel | |
| 2011/0238010 A1 | 9/2011 | Kirshenman et al. | |
| 2012/0001860 A1 | 1/2012 | Phan Le | |
| 2012/0071752 A1 | 3/2012 | Sewell et al. | |
| 2012/0271319 A1* | 10/2012 | Bromander | G16H 50/50 606/130 |
| 2013/0172906 A1 | 7/2013 | Olson et al. | |
| 2014/0094825 A1 | 4/2014 | Flaherty et al. | |
| 2014/0194897 A1* | 7/2014 | Kirschenman | A61B 34/71 606/130 |
| 2014/0276389 A1 | 9/2014 | Walker | |
| 2014/0276646 A1* | 9/2014 | Wong | A61M 25/0105 604/528 |
| 2014/0277002 A1 | 9/2014 | Grace | |
| 2014/0277747 A1 | 9/2014 | Walker et al. | |
| 2015/0142013 A1 | 5/2015 | Tanner et al. | |
| 2015/0157497 A1 | 6/2015 | Hufford et al. | |
| 2015/0245876 A1* | 9/2015 | Kim | B25J 13/025 700/264 |
| 2016/0270780 A1 | 9/2016 | Hall et al. | |
| 2016/0346048 A1* | 12/2016 | Wenderow | A61B 34/30 |
| 2017/0007343 A1 | 1/2017 | Yu | |
| 2017/0348060 A1 | 12/2017 | Blacker | |
| 2017/0360518 A1 | 12/2017 | Reinstein et al. | |
| 2018/0071039 A1 | 3/2018 | Barnett | |
| 2018/0161108 A1 | 6/2018 | Savall et al. | |
| 2018/0168758 A1 | 6/2018 | Lutzow et al. | |
| 2018/0168761 A1 | 6/2018 | Vargas et al. | |
| 2018/0235719 A1 | 8/2018 | Jarc | |

(56) References Cited

U.S. PATENT DOCUMENTS

| | | |
|---|---|---|
| 2018/0325609 A1 | 11/2018 | Kostrzewski et al. |
| 2018/0353245 A1 | 12/2018 | Mccloud et al. |
| 2019/0015168 A1 | 1/2019 | Verner et al. |
| 2019/0090963 A1 | 3/2019 | Canady et al. |
| 2019/0142530 A1 | 5/2019 | Thompson et al. |
| 2019/0175887 A1 | 6/2019 | Shameli |
| 2019/0231459 A1 | 8/2019 | Mustufa et al. |
| 2019/0243468 A1 | 8/2019 | Parazynski et al. |
| 2019/0262089 A1 | 8/2019 | Marshall et al. |
| 2019/0269472 A1 | 9/2019 | Kralicky et al. |
| 2019/0282309 A1 | 9/2019 | Schaible et al. |
| 2019/0350662 A1 | 11/2019 | Huang et al. |
| 2019/0380801 A1 | 12/2019 | Savall et al. |
| 2019/0380802 A1 | 12/2019 | Savall et al. |
| 2020/0015916 A1 | 1/2020 | Schwab |
| 2020/0038125 A1 | 2/2020 | Farlow |
| 2020/0078104 A1* | 3/2020 | Bailey .................. A61B 46/10 |
| 2020/0129248 A1 | 4/2020 | Kelly et al. |
| 2020/0129249 A1 | 4/2020 | Kelly et al. |
| 2020/0129256 A1 | 4/2020 | Kelly et al. |
| 2020/0152190 A1 | 5/2020 | Itkowitz et al. |
| 2020/0170737 A1 | 6/2020 | Bassik |
| 2020/0397531 A1* | 12/2020 | Schrader ............ A61B 1/00194 |
| 2022/0211452 A1* | 7/2022 | Clark ........................ G05G 1/01 |

FOREIGN PATENT DOCUMENTS

| | | |
|---|---|---|
| CN | 102292692 | 12/2011 |
| CN | 109310848 | 2/2019 |
| EP | 0974889 | 1/2000 |
| EP | 1463613 | 10/2004 |
| EP | 1534118 | 6/2005 |
| EP | 2124800 | 12/2009 |
| EP | 2967521 | 1/2016 |
| EP | 3034028 | 6/2016 |
| EP | 2923669 | 6/2017 |
| EP | 3592272 | 1/2020 |
| JP | 2006253000 | 9/2006 |
| JP | 2008515135 | 5/2008 |
| JP | 2015037572 | 2/2015 |
| WO | 0161431 | 8/2001 |
| WO | 2003015428 | 12/2003 |
| WO | 2007005976 | 1/2007 |
| WO | 2010025338 | 3/2010 |
| WO | 2011094877 | 8/2011 |
| WO | 2014104088 | 7/2014 |
| WO | 2021011518 | 1/2021 |
| WO | 2021011533 | 1/2021 |
| WO | 2021011551 | 1/2021 |
| WO | 2021011554 | 1/2021 |
| WO | 2021011571 | 1/2021 |

OTHER PUBLICATIONS

Sato, et al., "Touche: Enhancing Tough Interaction on Humans, Screens, Liquids, and Everyday Objects", CHI' 12, May 5-10, 2012, Austin, Texas USA, Copyright 2012 ACM 978-1-4503-1015-4/12/05, 10 Pages.

* cited by examiner

SYSTEMS AND METHODS FOR A CONTROL STATION FOR ROBOTIC INTERVENTIONAL PROCEDURES USING A PLURALITY OF ELONGATED MEDICAL DEVICES

FIELD

Embodiments relate generally to the field of robotic medical procedure systems and, in particular, to systems, apparatus and methods for robotically controlling the movement of one or more elongated medical devices in robotic interventional medical procedures.

BACKGROUND

As used herein, the term elongated medical device (EMD) refers to, but is not limited to, catheters (e.g., guide catheters, microcatheters, balloon/stent catheters), wire-based devices (e.g., guidewires, embolization coils, stent retrievers, etc.), and medical devices comprising any combination of these. Wire-based devices include but are not limited to guidewires, microwires, proximal pushers for embolization coils, stent retrievers, self-expanding stents, and flow diverters. Typically, wire-based elongated medical devices (EMDs) do not have a hub or handle at their proximal terminal end.

Catheters and other EMDs may be used during minimally-invasive medical procedures for the diagnosis and/or treatment of diseases of various vascular systems, including neurovascular intervention (NVI) also known as neurointerventional surgery, percutaneous coronary intervention (PCI) and peripheral vascular intervention (PVI). These procedures typically involve navigating a guidewire through the vasculature, and advancing a catheter via the guidewire to deliver therapy.

A catheterization procedure starts by gaining access into the appropriate vessel, such as an artery or vein, with an introducer sheath using standard percutaneous techniques. Through the introducer sheath, a sheath or guide catheter is then advanced over a diagnostic guidewire to a primary location such as an internal carotid artery for NVI, a coronary ostium for PCI, or a superficial femoral artery for PVI. A guidewire suitable for the vasculature is then navigated through the sheath or guide catheter to a target location in the vasculature. In certain situations, such as in the presence of tortuous anatomy, a support catheter or microcatheter is inserted over the guidewire to assist in navigating the guidewire.

A physician or operator may use an imaging system (e.g., a fluoroscope) to obtain a cine a contrast-enhanced image for use as a roadmap of the vasculature to navigate the guidewire or catheter to the target location, for example, a lesion. Contrast-enhanced images are also obtained while the physician delivers the guidewire or catheter so that the physician can verify that the device is moving along the correct path to the target location. While observing the anatomy using fluoroscopy, the physician manipulates the proximal end of the guidewire or catheter to direct the distal tip into the appropriate vessels toward the lesion or target anatomical location and avoid advancing into side branches.

Robotic catheter-based procedure systems have been developed that may be used to aid a physician in performing catheterization procedures such as, for example, NVI, PCI and PVI. Examples of NVI procedures include coil embolization of aneurysms, liquid embolization of arteriovenous malformations and mechanical thrombectomy of large vessel occlusions in the setting of acute ischemic stroke. In an NVI procedure, the physician uses a robotic system to gain target lesion access by controlling the manipulation of a neurovascular guidewire and microcatheter to deliver the therapy to restore normal blood flow. Target access is enabled by the sheath or guide catheter but may also require an intermediate catheter for more distal territory or to provide adequate support for the microcatheter and guidewire. The distal tip of a guidewire is navigated into, or past, the lesion depending on the type of lesion and treatment. For treating aneurysms, the microcatheter is advanced into the lesion and the guidewire is removed and several embolization coils are deployed into the aneurysm through the microcatheter and used to block blood flow into the aneurysm. For treating arteriovenous malformations, a liquid embolic is injected into the malformation via a microcatheter. Mechanical thrombectomy to treat vessel occlusions can be achieved either through aspiration and/or use of a stent retriever. Depending on the location of the clot, aspiration is either done through an aspiration catheter, or through a microcatheter for smaller arteries. Once the aspiration catheter is at the lesion, negative pressure is applied to remove the clot through the catheter. Alternatively, the clot can be removed by deploying a stent retriever through the microcatheter. Once the clot has integrated into the stent retriever, the clot is retrieved by retracting the stent retriever and microcatheter (or intermediate catheter) into the guide catheter.

In PCI, the physician uses a robotic system to gain lesion access by manipulating a coronary guidewire to deliver the therapy and restore normal blood flow. The access is enabled by seating a guide catheter in a coronary ostium. The distal tip of the guidewire is navigated past the lesion and, for complex anatomies, a microcatheter may be used to provide adequate support for the guidewire. The blood flow is restored by delivering and deploying a stent or balloon at the lesion. The lesion may need preparation prior to stenting, by either delivering a balloon for pre-dilation of the lesion, or by performing atherectomy using, for example, a laser or rotational atherectomy catheter and a balloon over the guidewire. Diagnostic imaging and physiological measurements may be performed to determine appropriate therapy by using imaging catheters or fractional flow reserve (FFR) measurements.

In PVI, the physician uses a robotic system to deliver the therapy and restore blood flow with techniques similar to NVI. The distal tip of the guidewire is navigated past the lesion and a microcatheter may be used to provide adequate support for the guidewire for complex anatomies. The blood flow is restored by delivering and deploying a stent or balloon to the lesion. As with PCI, lesion preparation and diagnostic imaging may be used as well.

When support at the distal end of a catheter or guidewire is needed, for example, to navigate tortuous or calcified vasculature, to reach distal anatomical locations, or to cross hard lesions, an over-the-wire (OTW) catheter or coaxial system is used. An OTW catheter includes a lumen for the guidewire that extends the full length of the catheter. This provides a relatively stable system because the guidewire is supported along the whole length. This system, however, has some disadvantages, including higher friction, and longer overall length compared to rapid-exchange catheters.

Typically, to remove or exchange an OTW catheter while maintaining the position of the indwelling guidewire, the exposed length (i.e., the length residing outside of the patient) of guidewire must be longer than the OTW catheter. A 300 cm long guidewire is typically sufficient for this purpose and is often referred to as an exchange length guidewire. Due to the length of the guidewire, two operators are needed to remove or exchange an OTW catheter. This becomes even more challenging if a triple coaxial, known in the art as a tri-axial system, is used (quadruple coaxial catheters have also been known to be used). However, due to its stability, an OTW system is often used in NVI and PVI procedures. On the other hand, PCI procedures often use rapid exchange (or monorail) catheters. The guidewire lumen in a rapid exchange catheter runs only through a distal section of the catheter, called the monorail or rapid exchange (RX) section. With a RX system, the operator manipulates the interventional devices parallel to each other (as opposed to with an OTW system, in which the devices are manipulated in a serial configuration), and the exposed length of guidewire only needs to be slightly longer than the RX section of the catheter. A rapid exchange length guidewire is typically 180-200 cm long. Given the shorter length guidewire and monorail, RX catheters can be exchanged by a single operator. However, RX catheters are often inadequate when more distal support is needed.

When performing vascular interventional procedures, the operator generally uses a set of controls provided at a control station in order to control the robotic system to move each catheter or wire. Each of the controls is typically configured to a control a specific device, or to move the catheter or wire in a specific manner. Thus, it is sometimes necessary for the operator to switch between different controls or operate multiple controls simultaneously. Systems for facilitating operator control of multiple EMDs during a robotic vascular interventional procedure are desired.

SUMMARY

Some embodiments include a system for controlling a robotic drive configured to move one or more elongated medical devices. The system includes a housing comprising a first surface and a second surface not co-planar with the first surface, a first control integrated with the first surface and manipulable by a first digit of a first hand of a user to select one of the one or more elongated medical devices and a second control integrated with the second surface and manipulable by a second digit of the first hand of the user to instruct the robotic drive to move the selected elongated medical device in a first degree of freedom. The first control and the second control are simultaneously manipulable by the first digit and the second digit.

In accordance with some embodiments, a system for controlling a robotic drive configured to move one or more elongated medical devices includes a housing comprising a first surface and a second surface not co-planar with the first surface. A first control is integrated with the first surface and manipulable by a thumb of a first hand of a user, and a second control is integrated with the second surface and manipulable by a second digit of the first hand of the user to instruct the robotic drive to control a linear speed of one of the one or more elongated medical devices. A third control is integrated with the second surface and manipulable by the second digit of the first hand of the user to instruct the robotic drive to control a linear position of the one of the one or more elongated medical devices.

Some embodiments include a system for controlling a robotic drive configured to move one or more elongated medical devices. The system includes a housing comprising a first surface and a second surface not co-planar with the first surface, a first control integrated with the first surface and manipulable by a first digit of a first hand of a user to instruct the robotic drive to move one of the one or more elongated medical devices in a first degree of freedom, and a second control integrated with the second surface and manipulable by a second digit of the first hand of the user to instruct the robotic drive to move the one of the one or more elongated medical devices in a second degree of freedom.

BRIEF DESCRIPTION OF THE DRAWINGS

Embodiments will become more fully understood from the following detailed description, taken in conjunction with the accompanying drawings, wherein the reference numerals refer to like parts in which.

DETAILED DESCRIPTION

The following description is provided to enable any person in the art to make and use the described embodiments. Various modifications, however, will be readily-apparent to those in the art.

Figure 1:
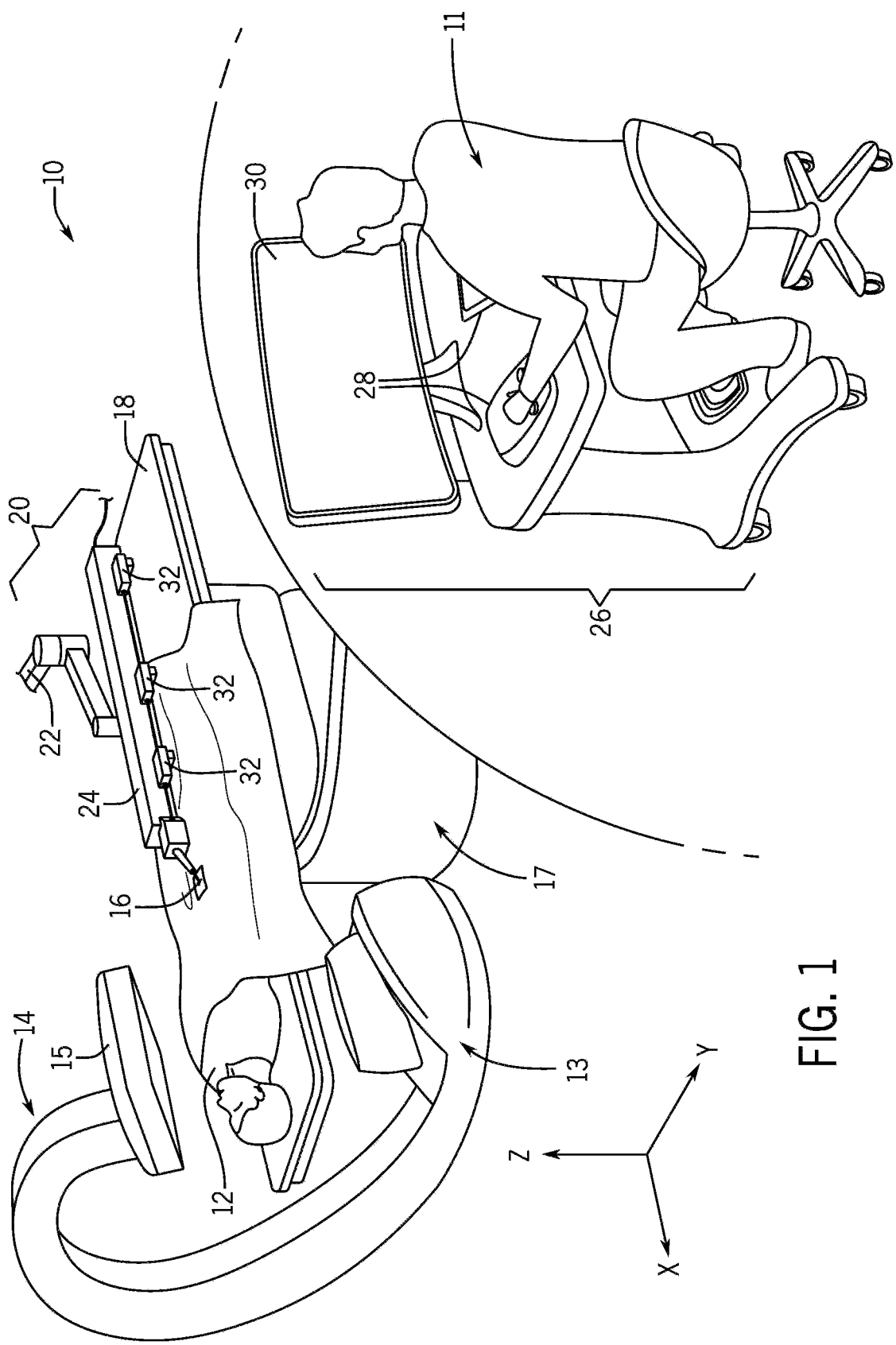
FIG. 1 is a perspective view of an exemplary catheter-based procedure system in accordance with some embodiments.

FIG. 1 is a perspective view of an exemplary catheter-based procedure system 10 in accordance with some embodiments. Catheter-based procedure system 10 may be used to perform catheter-based medical procedures, e.g., percutaneous intervention procedures such as a percutaneous coronary intervention (PCI) (e.g., to treat STEMI), a neurovascular interventional procedure (NVI) (e.g., to treat an emergent large vessel occlusion (ELVO)), peripheral vascular intervention procedures (PVI) (e.g., for critical limb ischemia (CLI), etc.). Catheter-based medical procedures may include diagnostic catheterization procedures during which one or more catheters or other elongated medical devices (EMDs) are used to aid in the diagnosis of a patient's disease. For example, during one embodiment of a catheter-based diagnostic procedure, a contrast media is injected into one or more arteries through a catheter and an image of the patient's vasculature is acquired whole the contrast media resides therein.

Catheter-based medical procedures may also include catheter-based therapeutic procedures (e.g., angioplasty, stent placement, treatment of peripheral vascular disease, clot removal, arterial venous malformation therapy, treatment of aneurysm, etc.) during which a catheter (or other EMD) is used to treat a disease. Therapeutic procedures may be enhanced by the inclusion of adjunct devices 54 (shown in FIG. 2) such as, for example, intravascular ultrasound (IVUS), optical coherence tomography (OCT), fractional flow reserve (FFR), etc. It should be noted, however, that one in the art would recognize that certain specific percutaneous intervention devices or components (e.g., type of guidewire, type of catheter, etc.) may be selected based on the type of procedure that is to be performed. Catheter-based procedure system 10 can perform any number of catheter-based medical procedures with minor adjustments to accommodate the specific percutaneous intervention devices to be used in the procedures.

Catheter-based procedure system 10 includes, among other elements, a bedside unit 20 and a control station 26. Bedside unit 20 includes a robotic drive 24 and a positioning system 22 that are located adjacent to a patient 12. Patient 12 is supported on a patient table 18. The positioning system 22 is used to position and support the robotic drive 24. The positioning system 22 may be, for example, a robotic arm, an articulated arm, a holder, etc. The positioning system 22 may be attached at one end to, for example, a rail on the patient table 18, a base, or a cart. The other end of the positioning system 22 is attached to the robotic drive 24. The positioning system 22 may be moved out of the way (along with the robotic drive 24) to allow for the patient 12 to be placed on the patient table 18. Once the patient 12 is positioned on the patient table 18, the positioning system 22 may be used to situate or position the robotic drive 24 relative to the patient 12 for the procedure. In some embodiments, patient table 18 is operably supported by a pedestal 17, which is secured to the floor and/or earth. Patient table 18 is able to move with multiple degrees of freedom, for example, roll, pitch, and yaw, relative to the pedestal 17. Bedside unit 20 may also include controls and displays 46 (shown in FIG. 2). For example, controls and displays may be located on a housing of the robotic drive 24.

The term front will refer to the side of the robotic drive 24 that faces the patient 12 and away from the positioning system 22, while the term rear refers to the side of the robotic drive 24 that is closest to the positioning system 22. The terms top, up, and upper refer to the general direction away from the direction of gravity and the terms bottom, down, and lower refer to the general direction in the direction of gravity.

Generally, the robotic drive 24 may be equipped with the appropriate percutaneous interventional devices and accessories 48 (shown in FIG. 2) (e.g., guidewires, various types of catheters including balloon catheters, stent delivery systems, stent retrievers, embolization coils, liquid embolics, aspiration pumps, device to deliver contrast media, medicine, hemostasis valve adapters, syringes, stopcocks, inflation device, etc.) to allow the user or operator 11 to perform a catheter-based medical procedure via a robotic system by operating various controls of a control system as described herein such as the controls and inputs located at the control station 26. Bedside unit 20, and in particular the robotic drive 24, may include any number and/or combination of components to provide bedside unit 20 with the functionality described herein. A user or operator 11 at control station 26 is referred to herein as the control station user, control station operator, user or operator. A user or operator at bedside unit 20 is referred to as bedside unit user or bedside unit operator.

Figure 3:
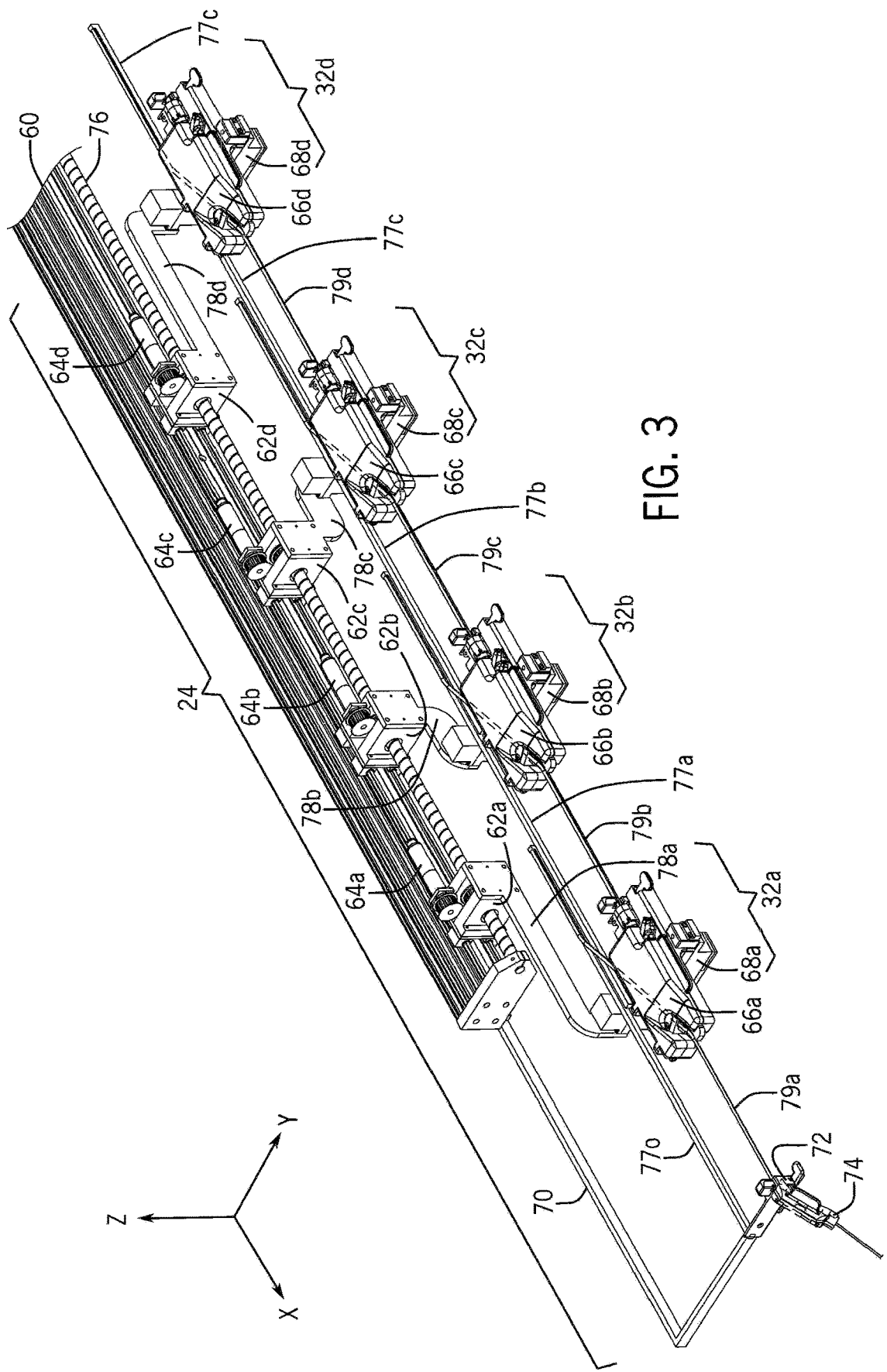
FIG. 3 is a perspective view of a robotic drive for a catheter-based procedure system in accordance with some embodiments.

The robotic drive 24 includes a plurality of device modules 32a-d mounted to a rail or linear member 60 (shown in FIG. 3). The rail or linear member 60 guides and supports the device modules. Each of the device modules 32a-d may be used to drive an EMD such as a catheter or guidewire. For example, the robotic drive 24 may be used to automatically feed a guidewire into a diagnostic catheter and into a guide catheter in an artery of the patient 12. One or more devices, such as an EMD, enter the body (e.g., a vessel) of the patient 12 at an insertion point 16 via, for example, an introducer sheath.

Bedside unit 20 is in communication with control station 26, allowing signals generated by the controls of control station 26 to be transmitted wirelessly or via hardwire to bedside unit 20 to control various functions of bedside unit 20, including functions of the robotic drive 24. As discussed below, control station 26 may include a control computing system 34 (shown in FIG. 2) or be coupled to the bedside unit 20 through a control computing system 34. Bedside unit 20 may also provide feedback signals (e.g., loads, speeds, operating conditions, warning signals, error codes, etc.) to control station 26, control computing system 34 (shown in FIG. 2), or both. Communication between the control computing system 34 and various components of the catheter-based procedure system 10 may be provided via a communication link that may be a wireless connection, cable connections, or any other means capable of allowing communication to occur between components. Control station 26 or other similar control system may be located either at a local site (e.g., local control station 38 shown in FIG. 2) or at a remote site (e.g., remote control station and computing system 42 shown in FIG. 2).

The term local is used to refer to the location of the patient 12 and bedside unit 20. Catheter procedure system 10 may be operated by a control station 26 at the local site, a control station 26 at a remote site, or both a local control station 26 and a remote control station 26 at the same time. At a local site, user or operator 11 and control station 26 are located in the same room or an adjacent room to the patient 12 and bedside unit 20. As used herein, a local site is the location of the bedside unit 20 and a patient 12 or subject (e.g., animal or cadaver) and the remote site is the location of a user or operator 11 and a control station 26 used to control the bedside unit 20 remotely. The term remote is used to refer to locations that do not have physical access to the bedside unit 20 and/or patient 12 at a local site.

A control station 26 (and a control computing system) at a remote site may be in communication with the bedside unit 20 and/or a control computing system at a local site using communication systems and services 36 (shown in FIG. 2), for example, through the Internet. In some embodiments, the remote site and the local (patient) site are away from one another, for example, in different rooms in the same building, different buildings in the same city, different cities, or other different locations where the remote site does not have physical access to the bedside unit 20 and/or patient 12 at the local site.

Control station 26 generally includes one or more input systems 28 including controls configured to receive user manipulations for controlling robotic drive 24 and/or various other components or systems of catheter-based procedure system 10. In the embodiment shown, control station 26 allows the user or operator 11 to control bedside unit 20 to perform a catheter-based medical procedure. For example, input systems 28 may be configured to cause bedside unit 20 to perform various tasks using percutaneous intervention devices (e.g., EMDs) interfaced with the robotic drive 24 (e.g., to advance, retract, or rotate a guidewire, advance, retract or rotate a catheter, inflate or deflate a balloon located on a catheter, position and/or deploy a stent, position and/or deploy a stent retriever, position and/or deploy a coil, inject contrast media into a catheter, inject liquid embolics into a catheter, inject medicine or saline into a catheter, aspirate on a catheter, or to perform any other function that may be performed as part of a catheter-based medical procedure). Robotic drive 24 includes various drive mechanisms to cause movement (e.g., axial and rotational movement) of the components of the bedside unit 20 including the percutaneous intervention devices in response to user manipulation of the controls of one or more input systems 28.

As will be described below, one or more input systems 28 may include one or more touch screens, joysticks, scroll wheels, and/or buttons. In addition to input systems 28, the control station 26 may use additional user controls 44 (shown in FIG. 2) such as foot switches and microphones for voice commands, etc. Input systems 28 may be configured instruct advancement, retraction, and/or rotation of various components and percutaneous intervention devices such as, for example, a guidewire, and one or more catheters or microcatheters. Input system controls may include, for example, an emergency stop button, a multiplier button, device selection buttons and automated move buttons. When an emergency stop button is pushed, the power (e.g., electrical power) is shut off or removed to bedside unit 20. When in a speed control mode, a multiplier button acts to increase or decrease the speed at which the associated component is moved in response to a manipulation of input controls. When in a position control mode, a multiplier button changes the mapping between input distance and the output commanded distance.

An input system 28 may include device selection buttons to allow the user or operator 11 to select which of the percutaneous intervention devices loaded into the robotic drive 24 are controlled via user manipulation of input controls. Automated move buttons may be used to enable algorithmic movements that the catheter-based procedure system 10 may perform on a percutaneous intervention device without direct command from the user or operator 11. In one embodiment, input systems 28 may include one or more controls or icons (not shown) displayed on a touch screen (that may or may not be part of a display 30), that, when activated, cause operation of a component of the catheter-based procedure system 10.

An input system 28 may also include a balloon or stent control that is configured to instruct inflation or deflation of a balloon and/or deployment of a stent. An input system 28 may include one or more buttons, scroll wheels, joysticks, touch screen, etc. that is dedicated to instruct control of a particular component or components. In addition, one or more touch screens may display one or more icons (not shown) related to various portions of input systems 28 or to various components of catheter-based procedure system 10.

Control station 26 may include a display 30. In some embodiments, the control station 26 may include two or more displays 30. Display 30 may be configured to display information or patient specific data to the user or operator 11 located at control station 26. For example, display 30 may be configured to display image data (e.g., X-ray images, MRI images, CT images, ultrasound images, etc.), hemodynamic data (e.g., blood pressure, heart rate, etc.), patient record information (e.g., medical history, age, weight, etc.), lesion or treatment assessment data (e.g., IVUS, OCT, FFR, etc.). In addition, display 30 may be configured to display procedure specific information (e.g., procedural checklist, recommendations, duration of procedure, catheter or guidewire position, volume of medicine or contrast agent delivered, etc.). Further, display 30 may be configured to display information to provide the functionalities associated with control computing system 34 (shown in FIG. 2). Display 30 may include touch screen capabilities to provide some of the user input capabilities of the system.

Catheter-based procedure system 10 also includes an imaging system 14. Imaging system 14 may be any medical imaging system that may be used in conjunction with a catheter based medical procedure (e.g., non-digital X-ray, digital X-ray, CT, MRI, ultrasound, etc.). In an exemplary embodiment, imaging system 14 is a digital X-ray imaging device that is in communication with control station 26. In one embodiment, imaging system 14 may include a C-arm (shown in FIG. 1) that allows imaging system 14 to partially or completely rotate around patient 12 in order to obtain images at different angular positions relative to patient 12 (e.g., sagittal views, caudal views, anterior-posterior views, etc.). In one embodiment, imaging system 14 is a fluoroscopy system including a C-arm having an X-ray source 13 and a detector 15, also known as an image intensifier.

Imaging system 14 may be configured to acquire X-ray images of the appropriate area of patient 12 during a procedure. For example, imaging system 14 may be configured to acquire one or more X-ray images of the head to diagnose a neurovascular condition. Imaging system 14 may also be configured to take one or more X-ray images (e.g., real time images) during a catheter-based medical procedure to assist the user or operator 11 of control station 26 to properly position a guidewire, guide catheter, microcatheter, stent retriever, coil, stent, balloon, etc. during the procedure. The image or images may be displayed on display 30. For example, images may be displayed on display 30 to allow the user or operator 11 to accurately move a guide catheter or guidewire into the proper position.

In order to clarify directions, a rectangular coordinate system is introduced with X, Y, and Z axes. The positive X axis is oriented in a longitudinal (axial) distal direction, that is, in the direction from the proximal end to the distal end, stated another way from the proximal to distal direction. The Y and Z axes are in a transverse plane to the X axis, with the positive Z axis oriented up, that is, in the direction opposite of gravity, and the Y axis is automatically determined by right-hand rule.

Figure 2:
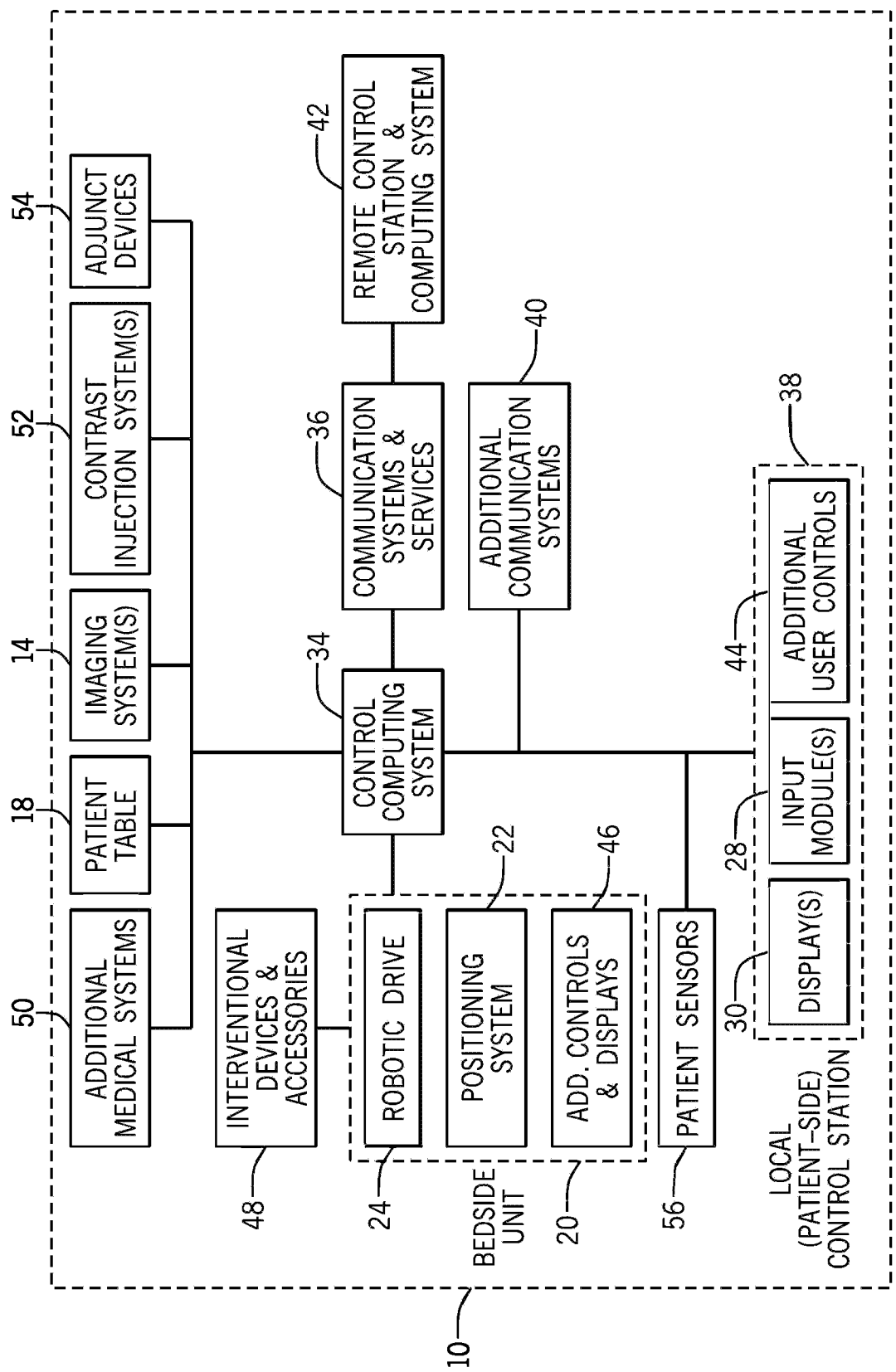
FIG. 2 is a schematic block diagram of an exemplary catheter-based procedure system in accordance with some embodiments.

FIG. 2 is a block diagram of catheter-based procedure system 10 in accordance with an exemplary embodiment. Catheter-procedure system 10 may include a control computing system 34. Control computing system 34 may physically be, for example, part of control station 26 (shown in FIG. 1). Control computing system 34 may generally comprise a computer processing unit suitable to provide catheter-based procedure system 10 with the various functionalities described herein. For example, control computing system 34 may be an embedded system, a dedicated circuit, a general-purpose system programmed with the functionality described herein, etc. Control computing system 34 is in communication with bedside unit 20, communications systems and services 36 (e.g., Internet, firewalls, cloud services, session managers, a hospital network, etc.), a local control station 38, additional communications systems 40 (e.g., a telepresence system), a remote control station and computing system 42, and patient sensors 56 (e.g., electrocardiogram (ECG) devices, electroencephalogram (EEG) devices, blood pressure monitors, temperature monitors, heart rate monitors, respiratory monitors, etc.). Control computing system 34 is also in communication with imaging system 14, patient table 18, additional medical systems 50, contrast injection systems 52 and adjunct devices 54 (e.g., IVUS, OCT, FFR, etc.). The bedside unit 20 includes a robotic drive 24, a positioning system 22 and may include additional controls and displays 46. As mentioned above, the additional controls and displays may be located on a housing of the robotic drive 24. Interventional devices and accessories 48 (e.g., guidewires, catheters, etc.) interface to the bedside unit 20. In some embodiments, interventional devices and accessories 48 may include specialized devices (e.g., IVUS catheter, OCT catheter, FFR wire, diagnostic catheter for contrast, etc.) which interface to their respective adjunct devices 54, namely, an IVUS system, an OCT system, and FFR system, etc.

In various embodiments, control computing system 34 is configured to receive and generate control signals based on user manipulation of the controls of one or more input systems 28 (e.g., of a control station 26 (shown in FIG. 1) such as a local control station 38 or a remote control station 42), and/or based on information accessible to control computing system 34, such that a medical procedure may be performed using catheter-based procedure system 10. The local control station 38 includes one or more displays 30, one or more input systems 28, and additional user controls 44.

The remote control station and computing system 42 may include similar components to the local control station 38. The remote 42 and local 38 control stations can be different and tailored based on their required functionalities. The additional user controls 44 may include, for example, one or more foot input controls. The foot input control may be configured to allow the user to select functions of the imaging system 14 such as turning on and off the X-ray and scrolling through different stored images. In another embodiment, a foot input device may be configured to allow the user to select which devices are mapped to which controls of an input system 28. Additional communication systems 40 (e.g., audio conference, video conference, telepresence, etc.) may be employed to help the operator interact with the patient, medical staff (e.g., angio-suite staff), and/or equipment in the vicinity of the bedside.

Catheter-based procedure system 10 may be connected or configured to include any other systems and/or devices not explicitly shown. For example, catheter-based procedure system 10 may include image processing engines, data storage and archive systems, automatic balloon and/or stent inflation systems, medicine injection systems, medicine tracking and/or logging systems, user logs, encryption systems, systems to restrict access or use of catheter-based procedure system 10, etc.

As mentioned, control computing system 34 is in communication with bedside unit 20 which includes a robotic drive 24, a positioning system 22 and may include additional controls and displays 46. Control computing system 34 may receive signals from remote control station 42 based on user manipulation of controls of an input system of remote control station 42, and may provide corresponding control signals to the bedside unit 20 to control the operation of the motors and drive mechanisms used to drive corresponding proximal portions of percutaneous intervention devices (e.g., guidewire, catheter, etc.) in various degrees of freedom, including but not limited to linearly and rotationally (i.e., around the linear axis). The various drive mechanisms may be provided as part of a robotic drive 24.

FIG. 3 is a perspective view of a robotic drive 24 for a catheter-based procedure system 10 in accordance with some embodiments. Embodiments are not limited to the robotic drive 24 of FIG. 3. The robotic drive 24 of FIG. 3 includes multiple device modules 32a-d coupled to a linear member 60. Each device module 32a-d is coupled to the linear member 60 via a stage 62a-d moveably mounted to the linear member 60. A device module 32a-d may be connected to a stage 62a-d using a connector such as an offset bracket 78a-d. In another embodiment, the device module 32a-d is directly mounted to the stage 62a-d. Each stage 62a-d may be independently actuated to move linearly along the linear member 60. Accordingly, each stage 62a-d (and the corresponding device module 32a-d coupled to the stage 62a-d) may independently move relative to each other and the linear member 60. A drive mechanism is used to actuate each stage 62a-d. In the embodiment shown in FIG. 3, the drive mechanism includes independent stage translation motors 64a-d coupled to each stage 62a-d and a stage drive mechanism 76, for example, a lead screw via a rotating nut, a rack via a pinion, a belt via a pinion or pulley, a chain via a sprocket, or the stage translation motors 64a-d may be linear motors themselves. In some embodiments, the stage drive mechanism 76 may be a combination of these mechanisms, for example, each stage 62a-d could employ a different type of stage drive mechanism. In some embodiments where the stage drive mechanism is a lead screw and rotating nut, the lead screw may be rotated and each stage 62a-d may engage and disengage from the lead screw to move, e.g., to advance or retract. In the embodiment shown in FIG. 3, the stages 62a-d and device modules 32a-d are in a serial drive configuration.

Each device module 32a-d includes a device module 68a-d and a cassette 66a-d mounted on and coupled to the device module 68a-d. In the embodiment shown in FIG. 3, each cassette 66a-d is mounted to the device module 68a-d in a vertical orientation. In other embodiments, each cassette 66a-d may be mounted to the device module 68a-d in other mounting orientations. Each cassette 66a-d is configured to interface with and support a proximal portion of an EMD (not shown). In addition, each cassette 66a-d may include elements to provide one or more degrees of freedom in addition to the linear motion provided by the actuation of the corresponding stage 62a-d to move linearly along the linear member 60. For example, the cassette 66a-d may include elements that may be used to rotate the EMD when the cassette is coupled to the device module 68a-d. Each device module 68a-d includes at least one coupler to provide a drive interface to the mechanisms in each cassette 66a-d to provide the additional degree of freedom. Each cassette 66a-d also includes a channel in which a device support 79a-d is positioned, and each device support 79a-d is used to prevent an EMD from buckling. A support arm 77a, 77b, and 77c is attached to each device module 32a, 32b, and 32c, respectively, to provide a fixed point for support of a proximal end of the device supports 79b, 79c, and 79d, respectively. The robotic drive 24 may also include a device support connection 72 connected to a device support 79, a distal support arm 70 and a support arm 77o. Support arm 77o is used to provide a fixed point for support of the proximal end of the distal-most support arm 79a housed in the distal most device module 32a. In addition, an introducer interface support (redirector) 74 may be connected to the device support connection 72 and an EMD (e.g., an introducer sheath). The configuration of robotic drive 24 has the benefit of reducing volume and weight of the drive robotic drive 24 by using actuators on a single linear member.

To prevent contaminating the patient with pathogens, healthcare staff use aseptic technique in a room housing the bedside unit 20 and the patient 12 or subject (shown in FIG. 1). A room housing the bedside unit 20 and patient 12 may be, for example, a cath lab or an angio suite. Aseptic technique consists of using sterile barriers, sterile equipment, proper patient preparation, environmental controls and contact guidelines. Accordingly, all EMDs and interventional accessories are sterilized and can only be in contact with either sterile barriers or sterile equipment. In some embodiments, a sterile drape (not shown) is placed over the non-sterile robotic drive 24. Each cassette 66a-d is sterilized and acts as a sterile interface between the draped robotic drive 24 and at least one EMD. Each cassette 66a-d can be designed to be sterile for single use or to be re-sterilized in whole or part so that the cassette 66a-d or its components can be used in multiple procedures.

As used herein, the term cassette generally refers to a component of a robotic drive system including components to support and move (e.g., rotate and/or translate) at least one EMD. A device module generally refers to a component of a robotic drive system that includes one or more motors with drive couplers which interface with the EMD-moving elements of the cassette. A cassette may provide a sterile interface between at least one EMD and a device module directly or through a device adapter. The term drive module refers to the combination of a device module and a cassette.

In some embodiments, an EMD is a catheter having a hub at a proximal end of the catheter and a flexible shaft extending from the hub toward the distal end of the catheter, wherein the shaft is more flexible than the hub. In one embodiment the catheter includes an intermediary portion that transitions between the hub and the shaft that has an intermediate flexibility that is less rigid than the hub and more rigid than the shaft. In some embodiments the intermediary portion is a strain relief.

The longitudinal axis of a member (for example, an EMD or other element in the catheter-based procedure system) is the line or axis along the length of the member that passes through the center of the transverse cross section of the member in the direction from a proximal portion of the member to a distal portion of the member. For example, the longitudinal axis of a guidewire is the central axis in the direction from a proximal portion of the guidewire toward a distal portion of the guidewire even though the guidewire may be non-linear in the relevant portion.

Axial movement of a member refers to translation of the member along the longitudinal axis of the member. For example, when the distal end of an EMD is axially moved in a distal direction along its longitudinal axis into or further into the patient, the EMD is being advanced. When the distal end of an EMD is axially moved in a proximal direction along its longitudinal axis out of or further out of the patient, the EMD is being withdrawn.

In this regard, axial insertion refers to inserting a first member into a second member along the longitudinal axis of the second member. For example, an EMD that is axially loaded in a collet is axially inserted in the collet. An example of axial insertion could be referred to as back loading a catheter on the proximal end of a guidewire. Lateral insertion refers to inserting a first member into a second member along a direction in a plane perpendicular to the longitudinal axis of the second member. Lateral insertion can also be referred to as radial loading or side loading.

Rotational movement of a member refers to the change in angular orientation of the member about the local longitudinal axis of the member. For example, rotational movement of an EMD corresponds to clockwise or counterclockwise rotation of the EMD about its longitudinal axis due to an applied torque. Continuous motion refers to motion that does not require a reset and is uninterrupted, while discrete motion refers to motion that requires a reset and is interrupted.

The terms distal and proximal define relative locations of two different features. With respect to a robotic drive, the terms distal and proximal are defined by the position of the robotic drive in its intended use relative to a patient.

When used to define a relative position, the distal feature is the feature of the robotic drive that is closer to the patient than a proximal feature when the robotic drive is in its intended in-use position. Within a patient, any vasculature landmark further away along the path from the access point is considered more distal than a landmark closer to the access point, where the access point is the point at which the EMD enters the patient. Similarly, the proximal feature is the feature that is farther from the patient than the distal feature when the robotic drive in its intended in-use position.

When used to define direction, the distal direction refers to a path on which something is moving or is aimed to move or along which something is pointing or facing from a proximal feature toward a distal feature and/or patient when the robotic drive is in its intended in-use position. The proximal direction is the opposite direction of the distal direction. For example, referring to FIG. 1, a robotic device is shown from the viewpoint of an operator facing a patient. In this arrangement, the distal direction is along the positive X coordinate axis and the proximal direction is along the negative X coordinate axis.

With respect to movement of modules, and referring to FIG. 3, an EMD is moved in a distal direction on a path toward a patient through the introducer interface support 74 which defines the distal end of the robotic drive 24. The proximal end of the robotic drive 24 is the point furthest from the distal end along the negative X axis.

With respect to positions of the individual modules, and also referring to FIG. 3, the most distal device module is the device module 32a closest to the distal end of the robotic drive 24. The most proximal device module is the device module 32d positioned furthest from the distal end of the robotic drive 24 along the negative X axis. The relative position of device modules is determined by their relative location to the distal end of the robotic drive. For example, device module 32*b* is distal to device module 32*c*.

With respect to distal/proximal portions, sections or ends of an EMD or the robotic drive, the portions of cassette 66*a* and device module 68*a* are defined by their relative location to the distal end of the robotic drive. For example, the distal end of cassette 66*a* is the portion of the cassette that is closest to the distal end of the robotic drive and the proximal end of cassette 66*a* is the portion of the cassette that is furthest from the distal end of the robotic drive along the negative X axis when the cassette is in-use position on device module 68*a*. Stated in another way, the distal end of cassette 66*a* is the portion of the cassette through which an EMD is closest to the path leading to a patient in the in-use position.

As previously discussed, embodiments of a control station 26 can include a variety of different input systems for controlling the bedside unit 20. Input systems can include a variety of different input controls (for example, buttons, scroll wheels, joysticks, etc.) that can be manipulated by a user to control (or, instruct) operation of the robotic drive 24. These input controls can be arranged in different layouts or patterns on the input system to facilitate desired functions and cooperative sequencing thereof to perform a desired task requiring independent (and sometimes simultaneous) movement of multiple EMDs.

Additionally, embodiments of an input system can be configured to operate in a variety of different control modes. The functions assigned to one or more controls of an input system in a first control mode may differ from the functions assigned to the one or more controls in a second control mode, and control modes may be selected based on the procedure being performed, the device or devices to be controlled, user preferences, or any other factors. The input system can be configured to switch between different control modes in response to input from the user or the control computing system 34.

An input system as described herein may be fixed to, integrated with, or simply rested atop a surface of the control station 26. As described herein, an input system may comprise a single integrated housing or multiple independently-movable housings.

Figure 4A:
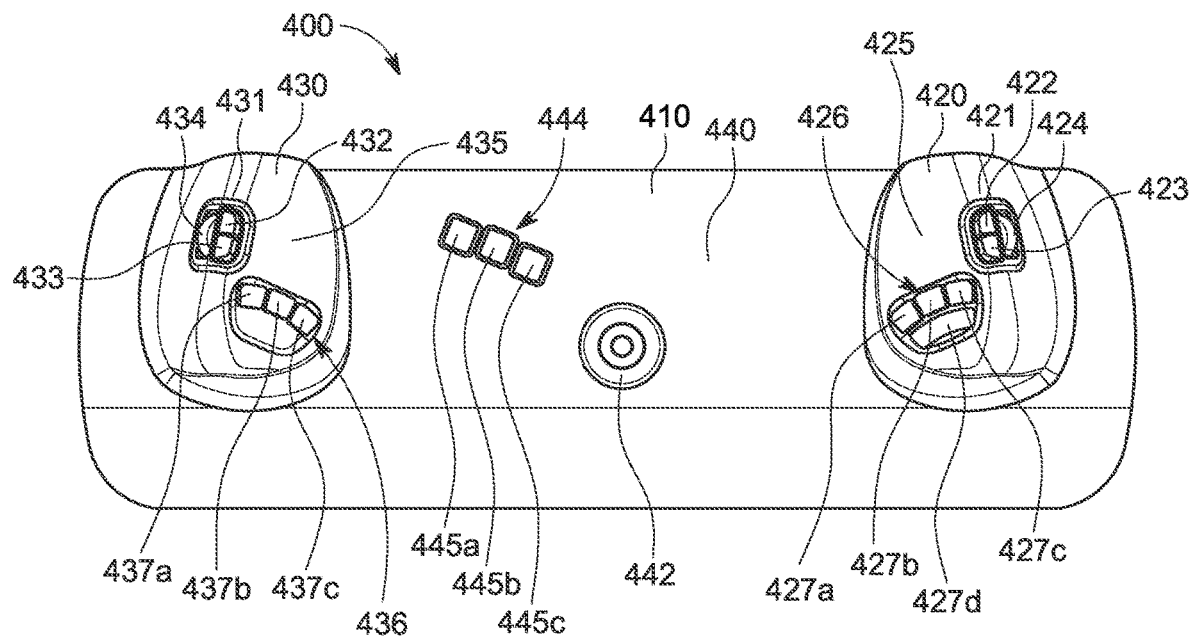
FIG. 4A is a perspective view of an input system for a catheter-based procedure system in accordance with some embodiments.

FIG. 4A is a perspective view of an input system 400 for controlling a robotic drive of a catheter-based procedure system in accordance with some embodiments. As will be described below, the input system 400 may facilitate selection of a set of one or more EMDs and linear movement of the selected set of EMDs using a first and second digit of a user's right hand, and, using the user's left hand, either rotation of the selected set of EMDs or selection and linear movement of a second set of one or more EMDs. In the latter case, no EMD belongs to both the first set and the second set.

The input system 400 includes a main housing 410 including a right control housing 420 and a left control housing 430. Housings 410, 420 and 430 may comprise any suitable materials, including but not limited to thermoplastic material. Housings 410, 420 and 430 house mechanical and electrical components for performing the functions attributed herein to each control of input system 400.

Figure 4B:
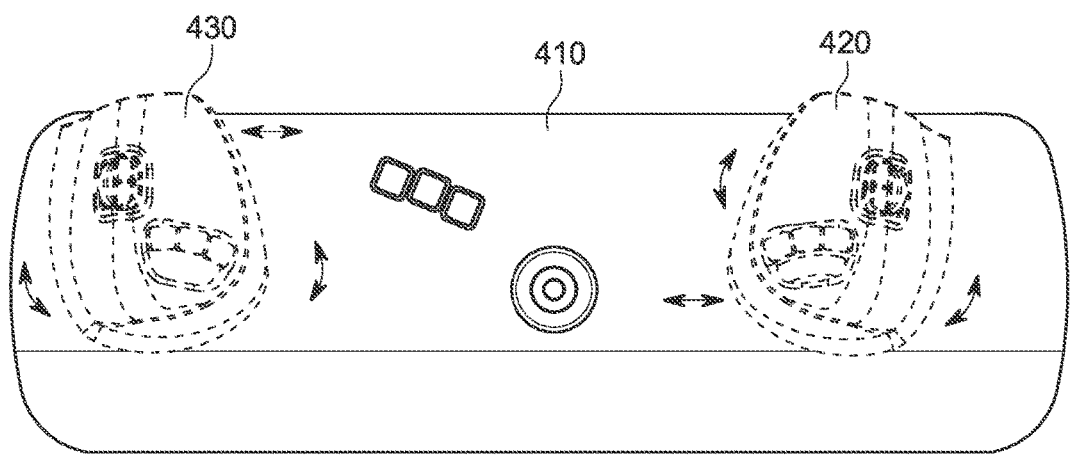
FIG. 4B is a perspective view of an input system for a catheter-based procedure system illustrating control housing position adjustment in accordance with some embodiments.

As illustrated in FIG. 4B, and according to some embodiments, a horizontal position and a rotational position of each of the right control housing 420 and the left control housing 430 may be changed by an operator. The position(s) may be changed to increase a comfort level of the user (i.e., to adapt the position(s) to the physical dimensions of the operator). In the illustrated example, the horizontal position of the housing 420 has been shifted to the left and the horizontal position of the housing 430 has also been shifted to the left as compared to their respective positions shown in FIG. 4A. Moreover, the housing 420 has rotated slightly clockwise and the housing 430 has rotated slightly counterclockwise. The direction or amount of horizontal or rotational movement of each housing 420 and 430 need not be identical.

According to some embodiments, elements (not shown) of housing 410 may be manipulated to release each housing 420, 430 from its current position, adjust the horizontal position and/or the rotational position as desired, and fix the horizontal and the rotational positions of each housing 420, 430 after adjustment so the positions do not inadvertently change during operation as described below. Elements of housing 410 may fix the horizontal distance between the right control housing 420 and the left control housing 430 such that both of the housings 420 and 430 can only be moved equal distances in a same direction, or the horizontal distance may be adjustable. Rotational adjustment may be limited to a particular number of degrees in either rotational direction.

Figure 5A:
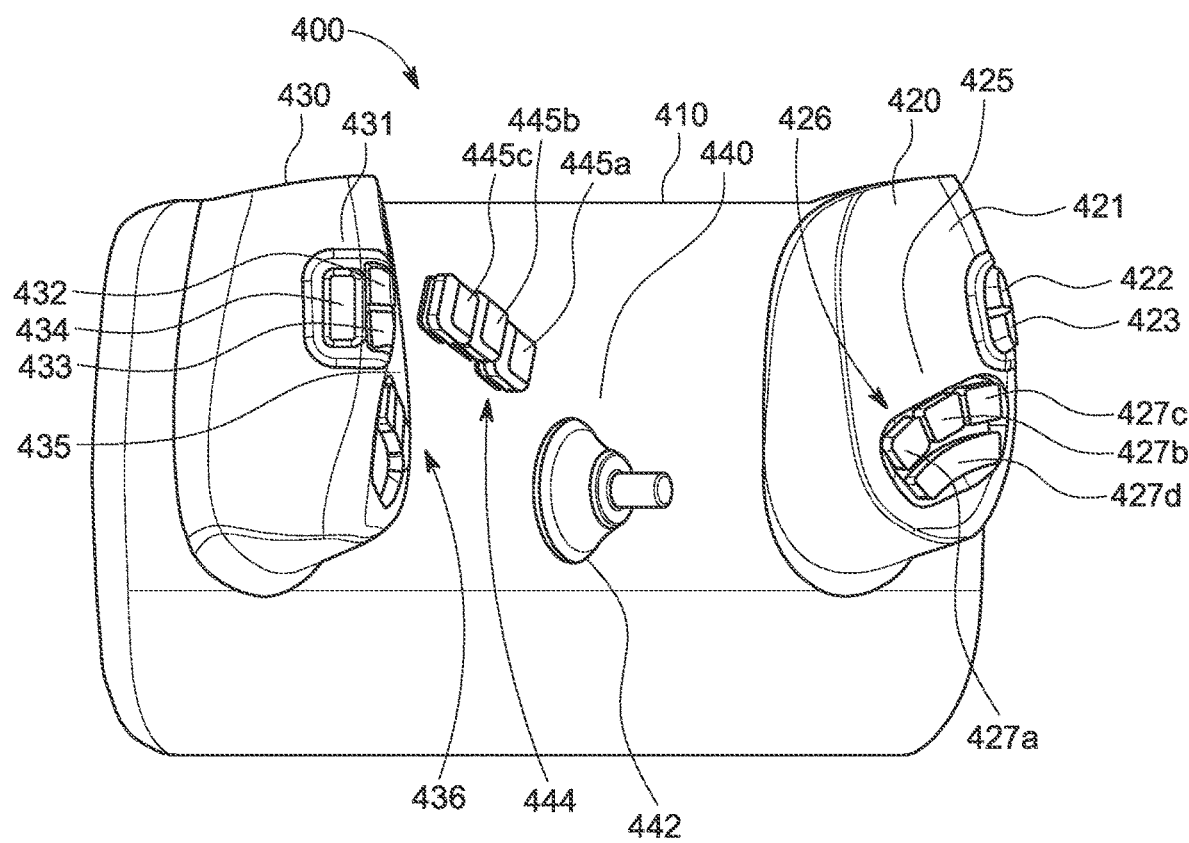
FIGS. 5A and 5B comprise right and left perspective views of an input system in accordance with some embodiments.
Figure 5B:
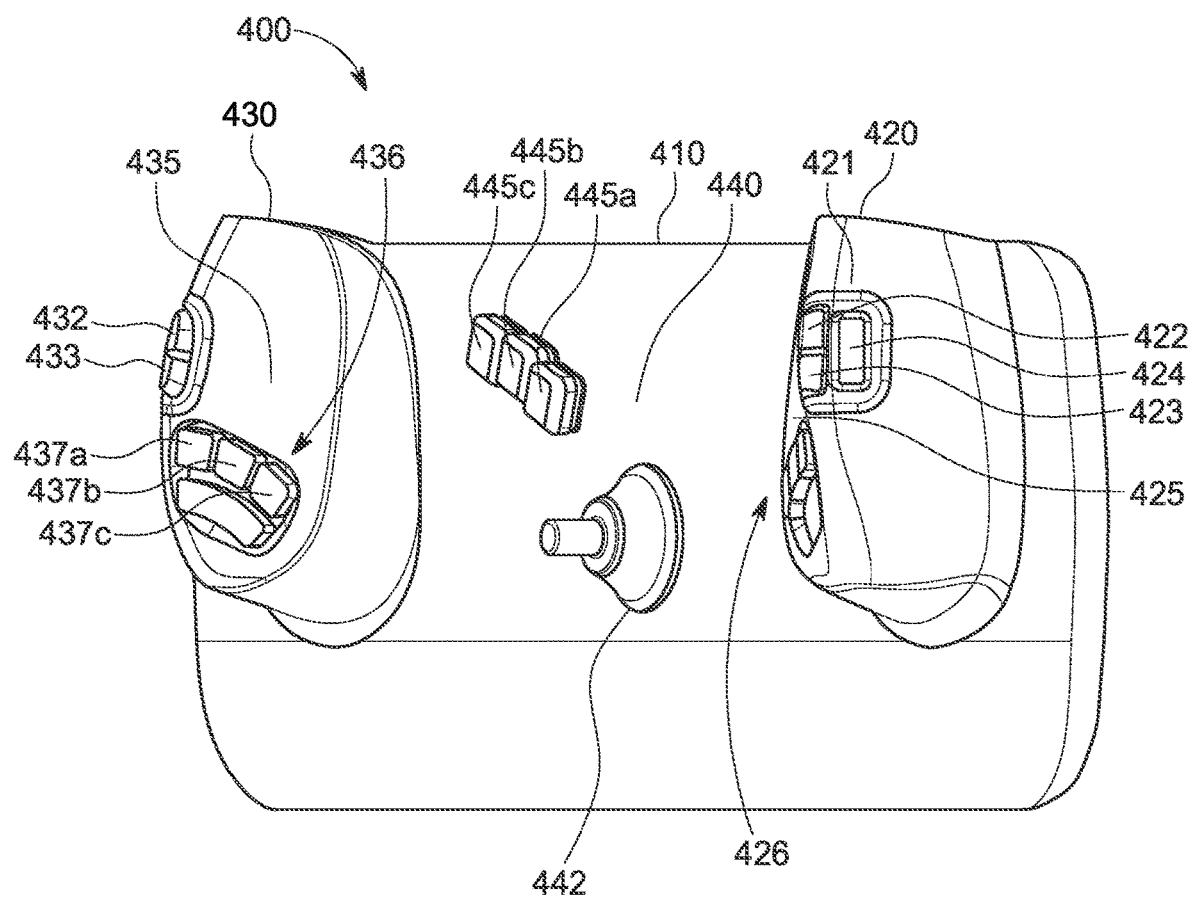

FIGS. 5A and 5B comprise right and left perspective views of the input system 400, provided to facilitate understanding of the following discussion of the controls of the input system 400.

Right control housing 420 includes a surface 421 and a surface 425. As shown most clearly in FIG. 5B, the surface 421 and the surface 425 are not co-planar with one another. The surface 425 may generally be referred to as a "top" surface while the surface 421 may be generally referred to as a "side" surface.

Either of both of surfaces 421 and 425 may be curved or shaped in any suitable manner. Either of both of surfaces 421 and 425 may be curved or shaped to allow comfortable positioning of a user's digits to manipulate controls integrated thereon. Positioning of a user's hand on surfaces 421 and 425 during operation will be described below.

Controls 422, 423 and 424 are integrated with the first surface 421 according to some embodiments. In the present example, such integration consists of the provision of openings in the surface 421 through which each of controls 422, 423 and 424 respectively protrude. In some embodiments, one or more controls are integrated with the surface 421 via mounting to the surface 421. In some embodiments, surface 421 defines a single opening through which controls 422, 423 and 424 protrude.

The portions of the surface 421 at which controls 422, 423 and 424 are located need not be co-planar. According to some embodiments, one or more of controls 422, 423 and 424 is located at a portion of the surface 421 which is curved with respect to a portion of the surface 421 at which another one of controls 422, 423 and 424 is located. As illustrated, surface 421 may be considered to consist of two non-co-planar surfaces, one of which integrates controls 422 and 423 and one of which integrates the control 424.

According to the present example, the control 424 comprises a scroll wheel and controls 422 and 423 comprise binary buttons. When a control 422 or 423 is manipulated (i.e., pressed) by the user, a signal is generated indicating that the control 422 or 423 has been pressed. For example, a signal may be generated when a control 422 or 423 is held in a pressed state, and/or when a control 422 or 423 is switched between the pressed and an unpressed state. According to some embodiments, one or both of controls 422 and 423 comprise an analog input control that generates a control signal which may vary between a minimum and a maximum value based on a degree to which it is depressed.

The scroll wheel 424 is partially enclosed within the right control housing 420 such that a portion of the scroll wheel 424 projects outward from the surface 421 and is manipulable by the user, while an opposite portion of the scroll wheel 424 is positioned within the right control housing 420. The axis of rotation of the scroll wheel 424 is generally parallel to the surface 421 so that, when rotated by a user, part of the exposed section of the scroll wheel 424 moves into the housing 420 while part of the hidden section of the scroll wheel 424 moves out of the housing 420 into view of the user.

Rotation of the scroll wheel 424 generates a signal which indicates how far and in which direction (and, in some embodiments, how fast) the scroll wheel 424 has been rotated. In some embodiments, the scroll wheel 424 includes a plurality of detents configured to provide discrete rotational positions for the scroll wheel 424. As the scroll wheel 424 is rotated between these positions, the detents may provide the user with tactile feedback. For example, the detents may provide initial resistance against rotation of the scroll wheel 424 but can then push the scroll wheel 424 once it is rotated far enough, thereby causing it to jump or "pop" into the next rotational position. The scroll wheel 424 can be configured to generate a signal each time it is moved between the rotational positions defined by the detents, providing a first signal when the scroll wheel 424 is rotated in a first direction and a second signal when rotated in a second direction opposite the first direction.

Selection controls 426 include controls 427a, 427b, 427c and 427d. Selection controls 426 are integrated with the surface 425 according to some embodiments. In the illustrated example, the surface 425 defines an opening through which each of controls 427a, 427b, 427c and 427d of controls 426 respectively protrude. Each of controls 427a, 427b, 427c and 427d may be integrated with the surface 425 in any other suitable manner in which the controls 426 can be considered substantially on and/or in the surface 425. One or more of controls 427a, 427b, 427c and 427d may be located at a portion of the surface 425 which is curved with respect to a portion of the surface 425 at which another one of controls 427a, 427b, 427c and 427d is located.

Controls 427a, 427b, 427c and 427d may comprise buttons which generate a signal when pressed. The generated signals may allow determination of which of controls 427a, 427b, 427c and 427d has been depressed in a case that a user presses more than one of controls 427a, 427b, 427c and 427d simultaneously.

Generally, each of controls 427a, 427b, 427c and 427d is manipulable by a digit of a user's hand to select an EMD, while each of controls 422, 423 and 424 is manipulable by another digit of the user's hand to instruct the robotic drive 24 to move the selected EMD in a first degree of freedom (e.g., linearly). For example, the control 422 may a comprise linear forward speed control while the control 423 may a comprise linear backward speed control. The control 424 may comprise a linear position control.

In some embodiments, a user presses one or more of controls 427a, 427b, 427c and 427d to select a corresponding one or more EMDs, and then selectively manipulates controls 422, 423 and 424 to instruct the robotic drive 24 to move the selected one or more EMDs linearly as desired. Depressing and releasing one or more of controls 427a, 427b, 427c and 427d may cause selection of a corresponding one or more EMDs until another one or more EMDs are selected, or selection of EMDs may occur only while corresponding controls 427a, 427b, 427c and 427d are depressed. In the latter case, the robotic drive is instructed to move an EMD only when its corresponding control 427a, 427b, 427c or 427d is depressed and one of controls 422, 423 and 424 is being simultaneously manipulated.

According to some embodiments, the control 427d is larger than any of the controls 427a, 427b and 427c and corresponds to a guidewire. In such an embodiment, each of controls 427a, 427b and 427c may correspond to a respective catheter. Embodiments are not limited to four controls 426 or to an equal amount of EMDs and controls 426. Embodiments are also not limited to a fixed correspondence between controls 427a, 427b, 427c and 427d and a respective EMD. The correspondences could be changed depending on an operating mode and/or the particular devices loaded in each cassette of the robotic drive 24.

Knob 442 and function buttons 444 are integrated with surface 440 of main housing 410. The surface 440 is not coplanar with either of surfaces 421 or 425. The knob 442 may be mounted to, may protrude from, or may be otherwise physically coupled to surface 440. The knob 442 may be a rotational position control and may be manipulable by a left hand of a user to instruct the robotic drive 24 to correspondingly rotate the one or more EMDs selected via controls 426.

Rotation of the knob 442 may generate a signal which indicates how far and in which direction (and, in some embodiments, how fast) the knob 442 has been rotated. In some embodiments, the knob 442 includes a plurality of detents configured to provide discrete rotational positions. The detents may provide initial resistance against rotation of the knob 442 but can urge the knob 442 into a next rotational position. The knob 442 can be configured to generate a signal each time it is moved between the rotational positions defined by the detents, providing a first signal when the knob 442 is rotated clockwise and a second signal when rotated counterclockwise.

Function buttons 444 may be configured to control system modes or settings, such as but not limited to changing the speed at which EMDs move in response to manipulation of other controls of the input system 400. Depressing and holding a function button 444 could invoke a "turbo" mode, increasing the rate of travel of any currently-selected EMDs (including any EMDs selected by controls 436, described below), or a "precision" mode, decreasing the rate of travel. Other modes may include algorithmic motion profiles such as a profile in which, when activated, an EMD spins a specific number of degrees each time it is retracted after having been advanced. One or more of function buttons 444 may operate as toggles which alternately invoke and disable a corresponding mode in response to user presses, rather than requiring constant depression by the user to maintain a mode.

Left control housing 430 includes a surface 431 and a surface 435. FIG. 5A shows that the surface 421 and the surface 425 are not co-planar. Similar to surfaces 421 and 425 of the right control housing 420, the surface 435 may generally be referred to as a "top" surface while the surface 431 may be generally referred to as a "side" surface. Either of both of surfaces 431 and 435 may be curved or shaped in any manner, for example to support portions of a user's left hand in a manner facilitating manipulation of controls 432, 433 and 434 with the digits thereof.

Controls 432, 433 and 434 are integrated with the first surface 431 according to some embodiments. Integration may consist of one or more openings defined in the surface 431 through which each of controls 432, 433 and 434 protrude. In some embodiments, one or more controls are integrated with the surface 431 via mounting to the surface 431. According to some embodiments, one or more of controls 432, 433 and 434 is located at a portion of the surface 431 which is curved with respect to a portion of the surface 431 at which another one of controls 432, 433 and 434 is located. Surface 431 may be considered to consist of two non-co-planar surfaces, one of which integrates controls 432 and 433 and one of which integrates the control 434.

The control 434 comprises a scroll wheel and controls 432 and 433 comprise binary buttons. As described with respect to controls 422 and 423, a signal is generated when a control 432 or 433 is pressed by a user. A signal may be generated when a control 432 or 433 is held in a pressed state, and/or when a control 432 or 433 is pressed and released. According to some embodiments, one or both of controls 432 and 433 comprise an analog input control that generates a control signal which may vary between a minimum and a maximum value based on a degree to which it is depressed.

The scroll wheel 434 is partially enclosed within the left control housing 430 as described with respect to the scroll wheel 424. Rotation of the scroll wheel 434 generates a signal which indicates the extent and direction of angular rotation. In some embodiments, the scroll wheel 434 includes a plurality of detents configured to provide discrete rotational positions for the scroll wheel 424. The detents may provide the user with tactile feedback as described above.

Selection controls 436 include controls 437a, 437b and 437c. Selection controls 436 are integrated with the surface 435 according to some embodiments. For example, the surface 435 defines an opening through which each of controls 437a, 437b and 437c protrude. As described with respect to controls 426, controls 437a, 437b and 437c may comprise buttons which generate a signal when pressed. The generated signals may allow determination of which of 437a, 437b and 437c has been depressed in a case that a user presses more than one of controls 437a, 437b and 437c simultaneously.

Each of controls 437a, 437b and 437c may be manipulable by a digit (e.g., thumb) of a user's left hand to select an EMD. In the illustrated example, controls 437a, 437b and 437c correspond to three catheters installed in the robotic drive 24, and none of controls 437a, 437b and 437c corresponds to the guidewire. Embodiments are not limited to a fixed correspondence between controls 437a, 437b and 437c and a respective EMD. The correspondences could be changed depending on an operating mode and/or the particular devices loaded in each cassette of the robotic drive 24.

Depressing and releasing one or more of controls 437a, 437b and 437c may cause selection of a corresponding one or more EMDs until another one or more EMDs are selected, or selection of EMDs may occur only while corresponding controls 437a, 437b and 437c are depressed.

Each of controls 432, 433 and 434 is manipulable by another digit (e.g., index finger) of the user's left hand to instruct the robotic drive 24 to move the currently-selected EMD(s) in a first degree of freedom (e.g., linearly). For example, the control 432 may a comprise linear forward speed control, the control 433 may a comprise linear backward speed control, and the control 434 may comprise a linear position control.

Figure 6A:
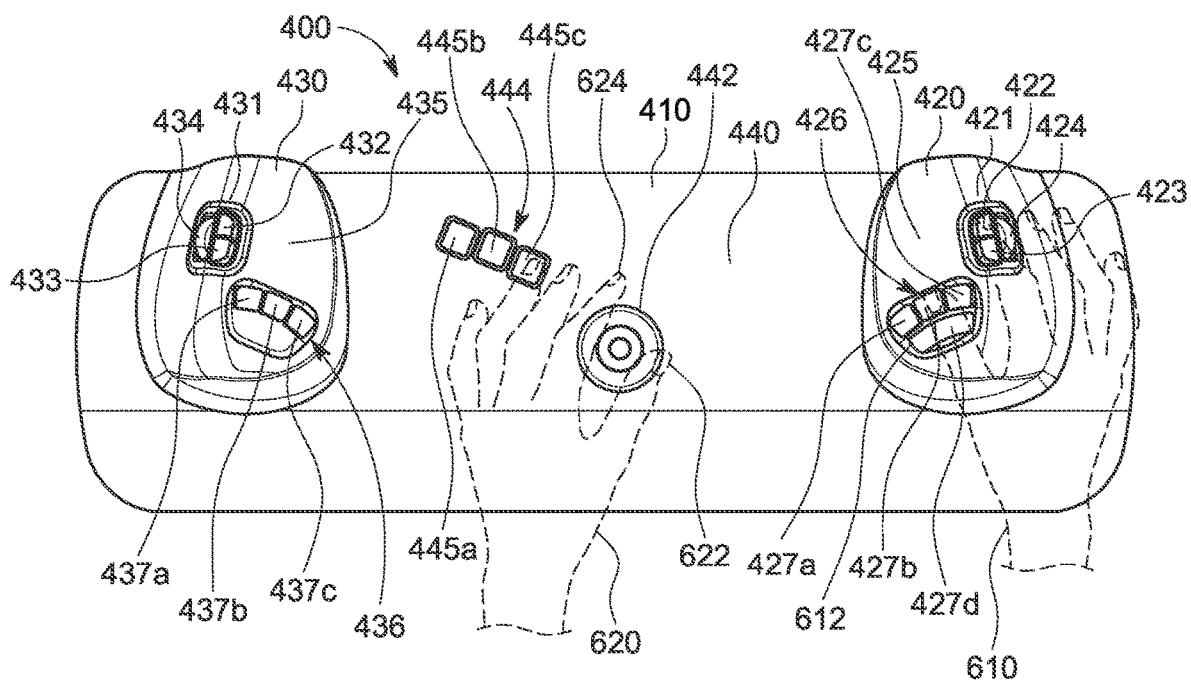
FIGS. 6A and 6B comprise perspective views of an input system during operation in accordance with some embodiments.
Figure 6B:
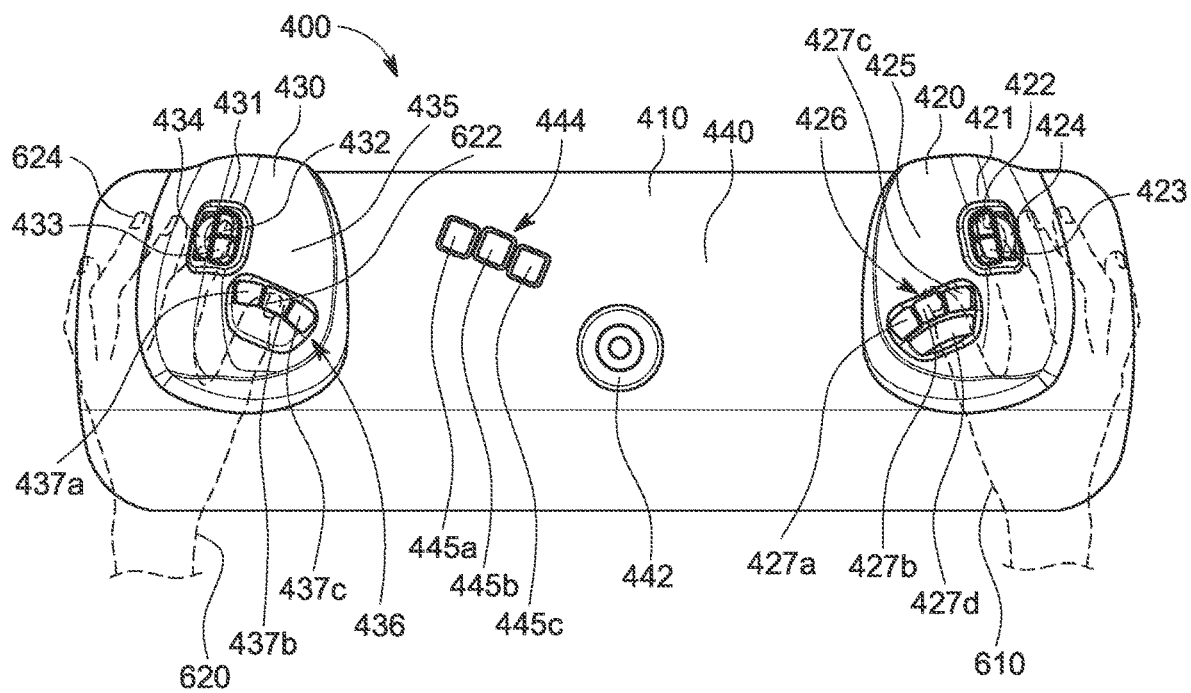

FIGS. 6A and 6B comprise perspective views of the input system 400 during operation in accordance with some embodiments. Generally, FIG. 6A illustrates the manipulation of controls 422, 423 and 424 to control motion of EMDs selected via controls 426 in a first degree of freedom (e.g., linear), and the manipulation of the knob 442 to control motion of the selected EMDs in a second degree of freedom (e.g., rotational).

As shown in FIG. 6A, a user's right hand 610 is positioned such that the thumb 612 rests on controls 426 of the surface 425, and the index finger 614 rests on/around controls 422, 423 and 424 of the surface 421. This hand position is facilitated by the relative and not co-planar positions of the surface 421 and the surface 425.

As noted above, the user may manipulate (i.e., press) one or more of controls 427a, 427b, 427c and 427d with the thumb 612 to select a corresponding one or more EMDs. The user may also selectively and independently manipulate controls 422, 423 and 424 to instruct the robotic drive 24 to move the one or more EMDs selected using the thumb 612 as desired in a first degree of freedom (e.g., linearly). The selection of one or more EMDs may be performed by pressing and releasing a corresponding one or more of controls 427a, 427b, 427c and 427d, in which case such selection remains until another one or more EMDs are selected, or may be performed by depressing and holding corresponding ones of controls 427a, 427b, 427c and 427d.

While one or more EMDs are selected using controls 426, FIG. 6A also illustrates the user's left hand 620 resting on surface 440. The left thumb 622 and the left index finger 624 grip the knob 442 and rotate the knob 442 to instruct the robotic drive 24 to rotate the one or more EMDs selected by controls 426. Other digits of the left hand 620 are available to select desired ones of function buttons 444 without requiring significant movement of the left hand 620 and, in some embodiments, without requiring the left thumb 622 and the left index finger 624 to move away from the knob 442.

It may be undesirable to rotate one or more EMDs positioned in the robotic drive 24. For example, it may be undesirable in some scenarios to rotate a stent retriever, a balloon catheter or an embolization coil. Accordingly, if an input system as described herein is used to select such an EMD, the user may be asked via display 30 whether rotation of the EMD is permitted. If rotation of the EMD is not permitted, and the user manipulates a control associated with the EMD such as, e.g., knob 442, rotation is disabled by either not transmitting a corresponding signal to the robotic drive 24 or configuring the robotic drive 24 to ignore such a signal.

In some embodiments, the system 10 is aware of the type of EMD loaded into each position of the robotic drive 24. Rotation may be automatically disabled as described above if a certain type of EMD is loaded into a selected position, without requiring user intervention. Such embodiments may allow a user to override this disabling so that rotational controls operate as described herein with respect to the EMD loaded into the selected position.

FIG. 6B illustrates operation of input system 400 in which the user's left hand 620 has moved to the left control housing 430. FIG. 6B illustrates the manipulation of controls 422, 423 and 424 to control motion of EMDs selected via controls 426 in a first degree of freedom (e.g., linear), and the manipulation of controls 432, 433 and 434 to control motion of other EMDs selected via controls 436 in the first degree of freedom (e.g., linear).

The left hand 620 is positioned such that the thumb 622 rests on controls 436 of the surface 435, and the index finger 624 rests on/around controls 432, 433 and 434 of the surface 431. As described above with respect to the right control housing 420, the left hand position is facilitated by the relative and not co-planar positions of the surface 431 and the surface 435.

The user may manipulate (i.e., press) one or more of controls 437a, 437b, and 437c with the thumb 622 to select a corresponding one or more EMDs. In some embodiments, any EMDs currently selected using controls 426 of the right control housing 420 cannot be selected using controls 437a, 437b or 437c. The user may selectively and independently manipulate controls 432, 433 and 434 to instruct the robotic drive 24 to move the one or more EMDs selected using the thumb 632 as desired in a first degree of freedom (e.g., linearly). The selection of one or more EMDs may be performed by pressing and releasing or by pressing and holding corresponding ones of controls 437a, 437b, and 437c.

Figure 7:
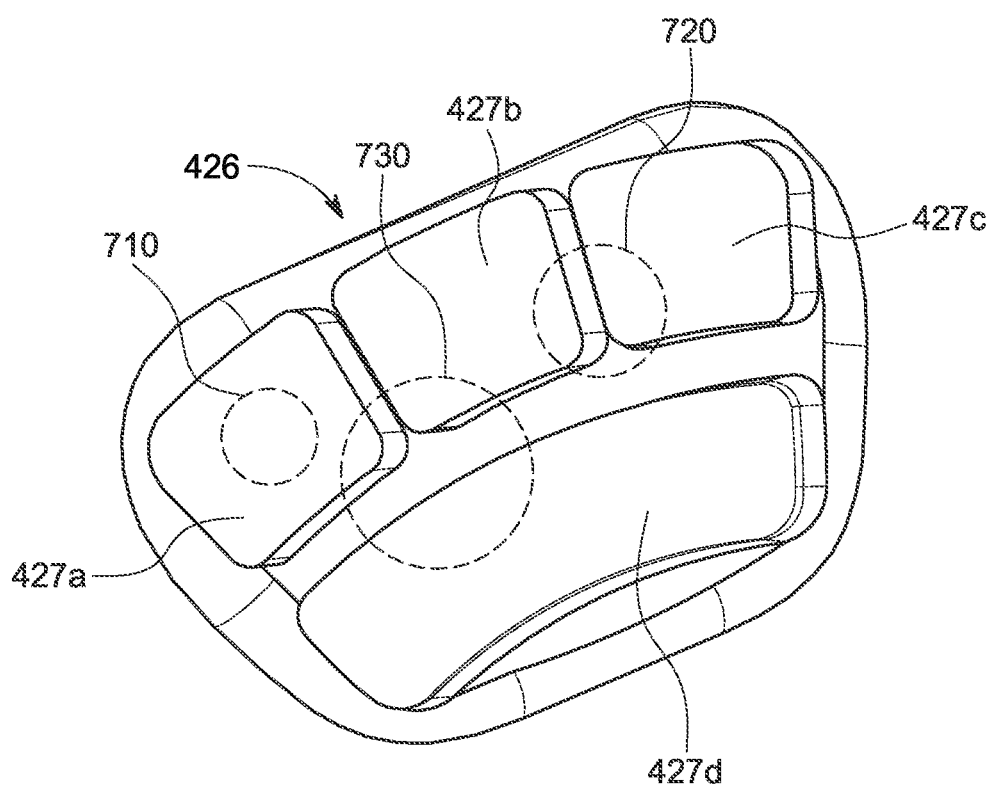
FIG. 7 is a perspective view of EMD selection controls in accordance with some embodiments.

FIG. 7 is a detailed view of controls 426 according to some embodiments. Controls 426 of FIG. 7 facilitate selection of one or more EMDs using one digit, e.g., a thumb. Controls 426 may facilitate toggled selection (i.e., press and release to select) or "continuous activation" in which an EMD is selected only when and while a corresponding control is depressed. Embodiments are not limited to controls 426 of FIG. 7.

According to some embodiments, controls 427a, 427b and 427c are arranged in a first arc to roughly correspond to an arc which would be traced by a user's thumb across the surface 425 while searching for controls 427a, 427b and 427c, so that the thumb may be optimally positioned over each of controls 427a, 427b and 427c without requiring hand repositioning. Control 427d may be shaped in an arc for similar reasons.

In some embodiments, each of controls 427a, 427b and 427c is assigned to a catheter loaded into respective drive positions 1, 2 or 3. Control 427d always corresponds to the guidewire. According to some embodiments, if the guidewire is loaded into position 2, then the control 427a, 427b or 427c assigned to position 2 is disabled (i.e., is not usable to select the guidewire loaded into position 2).

Controls 426 are disposed to facilitate multiple combinations thereof. A thumb pressed at the location 710 will result in selection of an EMD corresponding to control 427a (e.g., a catheter loaded into position 1). However, a thumb pressing at the location 720 will result in selection of EMDs corresponding to control 427b (e.g., a catheter loaded into position 2) and control 427c (e.g., a catheter loaded into position 3). Moreover, a thumb pressing at the location 730 will result in selection of EMDs corresponding to control 427a (e.g., a catheter loaded into position 1), control 427b (e.g., a catheter loaded into position 2) and control 427d (e.g., the guidewire).

According to some embodiments, each of controls 426 is wide relative to the thin gaps therebetween to facilitate simultaneous pressing of multiple controls. Some embodiments omit any static structure disposed between each of controls 426. Edges of each of controls 426 may be shaped to provide a tactile distinction between pressing 1, 2, or 3 buttons.

In some embodiments, each of controls 426 requires low activation force, provides a tactile sensation when passing the activation point, and allows overtravel pass the activation point. Overtravel may facilitate depressing a control past the activation point while manipulating other controls (e.g., controls 422, 423 or 424) with the same hand. In some embodiments, the height of controls 427a, 427b and 427c above the surface 425 may differ from the height of the control 427d above the surface 425 to increase an ability to distinguish therebetween by touch alone. Each control 426 may include design features to ensure relatively linear travel and maintenance of a relatively flat profile, even when pressed on edge.

Certain procedures show a need to select the foregoing combinations of EMDs, where the numbers denote drive positions in which the EMDs are positioned and "W" represents the guidewire: 1+2; 2+3; 1+W; 2+W; 3+W; 1+2+W; and 2+3+W. The foregoing arrangement may facilitate selection of each of these clinically-relevant combinations of EMDs via a single thumb press on a corresponding location of the control 426. With reference to FIG. 7, a thumb press on the location 710 depresses the control 427a to select a single EMD (e.g., 1), a thumb press on the location 720 depresses the controls 427b and 427c to select two EMDs (e.g., 2+3), and a thumb press on location 730 depresses controls 427a, 427b and 427d to select three EMDs (1+2+W). It is noted that the three selection techniques depicted in FIG. 7 do not account for the following combinations: 1+2+3; 1+3+W; and 1+2+3+W, which might not be particularly beneficial in many scenarios. These latter combinations are not, however, precluded by controls 426 of FIG. 7.

Figure 8:
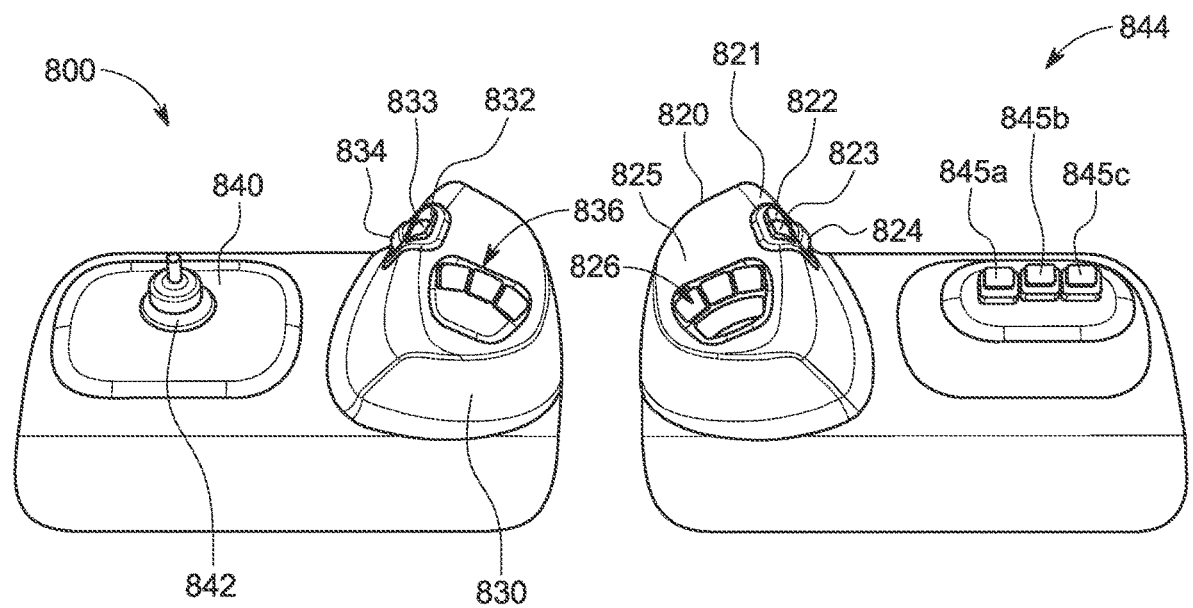
FIG. 8 is a perspective view of right and left control housings of an input system for a catheter-based procedure system in accordance with some embodiments.

FIG. 8 is a perspective view of a right control housing 820 and a left control housing 830 of an input system 800 for a catheter-based procedure system in accordance with some embodiments. The controls of the input system 800 are identical to those of the input system 400 described above, although physically arranged differently, and may operate similarly. Accordingly, controls and components labeled 4xx in the illustrations of the input system 400 are labeled 8xx in the illustrations of the input system 800 and similar explanations are applicable.

The right control housing 820 and the left control housing 830 are not integrated within a single main housing. Accordingly, a user may independently move the right control housing 820 and/or the left control housing 830 away or toward each other as desired. The knob 842 of the surface 840 is now disposed to the left of the left control housing 830. Also, function buttons 844 are disposed to the right of the right control housing 820.

In one example of operation, a user's right hand 610 positioned such that the thumb rests on controls 826 of the surface 825 of the right control housing 820, and the index finger rests on/around controls 822, 823 and 824 of the surface 821. The right thumb manipulates controls 826 to select one or more EMDs, and the right index finger simultaneously manipulates controls 822, 823 and 824 to instruct the robotic drive 24 to control motion of the selected EMDs in a first degree of freedom (e.g., linear). Simultaneously, a left hand of the user may manipulate the knob 842 to control motion of the selected EMDs in a second degree of freedom (e.g., rotational).

The left hand of the user may also move to the left control housing 830 such that the left thumb rests on controls 836 of the surface 835 and the left index finger rests on/around controls 832, 833 and 834 of the surface 831. The user may manipulate controls 836 with the left thumb to select a corresponding one or more EMDs, and may manipulate controls 832, 833 and 834 with the left finger to instruct the robotic drive 24 to control motion of the EMDs selected via controls 836 in a first degree of freedom (e.g., linear).

Figure 9A:
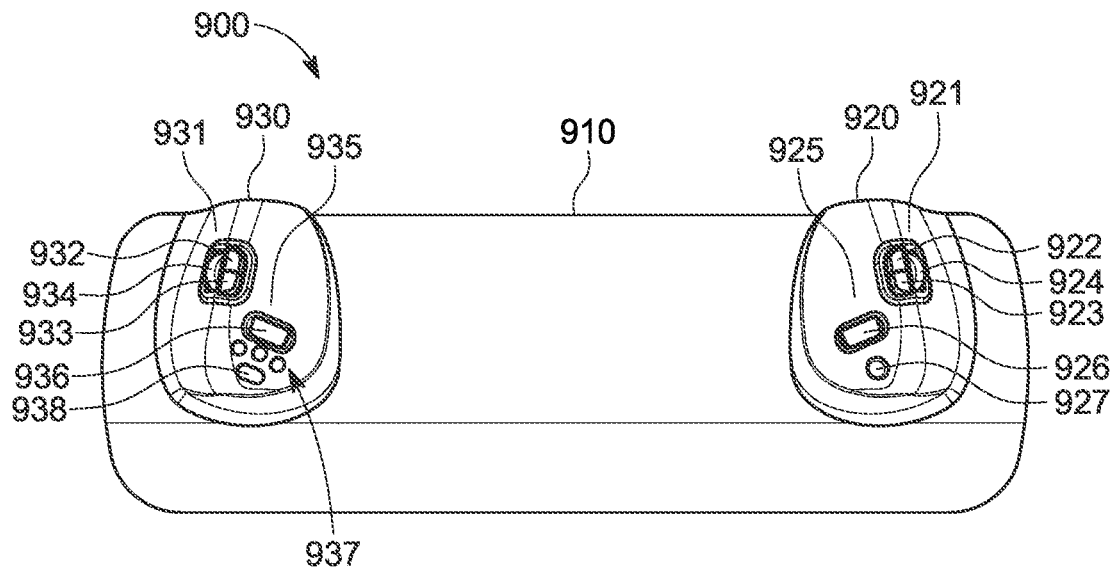
FIG. 9A is a perspective view of an input system for a catheter-based procedure system in accordance with some embodiments.
Figure 10A:
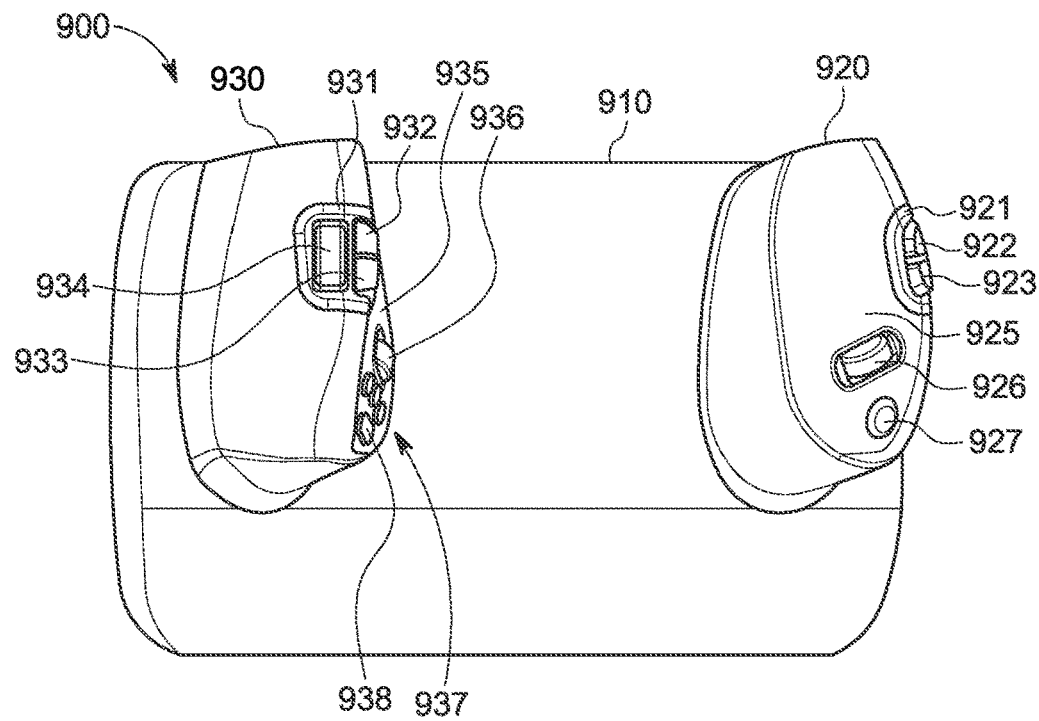
FIGS. 10A and 10B comprise right and left perspective views of an input system in accordance with some embodiments.
Figure 10B:
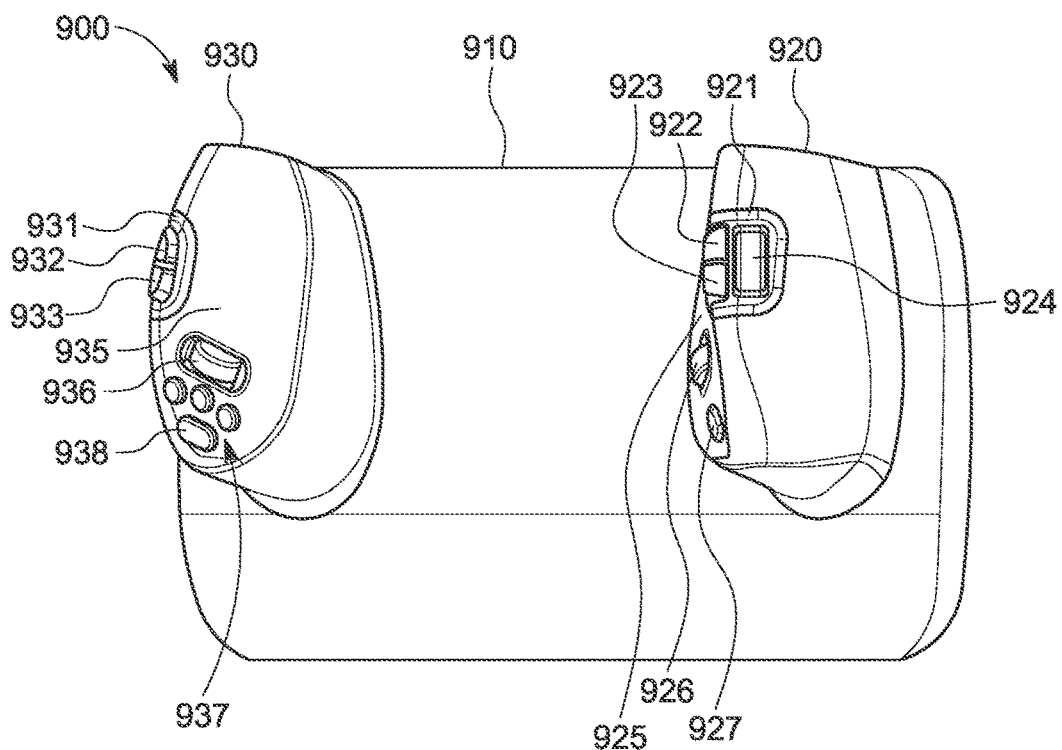

FIG. 9A is a perspective view of an input system 900 for controlling a robotic drive of a catheter-based procedure system in accordance with some embodiments. FIGS. 10A and 10B comprise right and left perspective views of the input system 900.

Figure 9B:
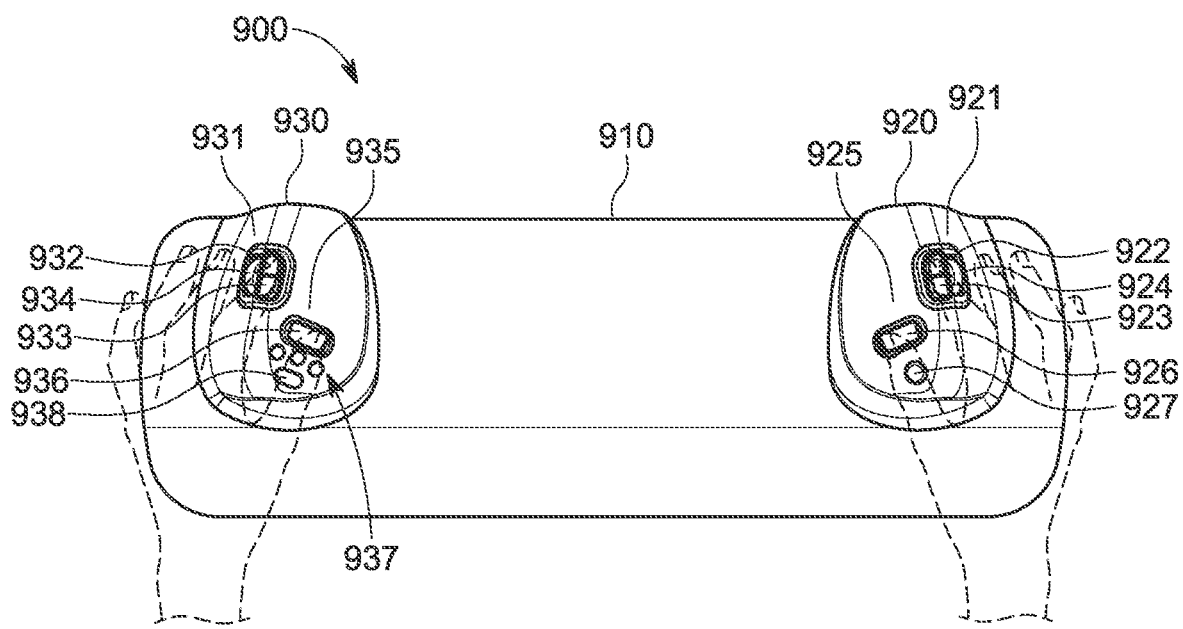
FIG. 9B is a perspective view of an input system for a catheter-based procedure system during operation in accordance with some embodiments.

The input system 900 may facilitate control of linear movement of an EMD using a first digit of a user's right hand and rotational movement of the EMD using a second digit of the user's right hand, and control of linear movement of a selected EMD using a first digit of a user's left hand and selection and rotational movement of the selected EMD using a second digit of the user's left hand. Such an operational arrangement is depicted in FIG. 9B.

The input system 900 includes a main housing 910 including a right control housing 920 and a left control housing 930. Right control housing 920 includes a "side" surface 921 and a "top" surface 925 which are not co-planar with one another. Either of both of surfaces 921 and 925 may be curved or shaped to comfortably support the portions of a user's hand with which the surfaces are intended to respectively make contact.

Controls 922, 923 and 924 are integrated with the first surface 921 according to some embodiments. In the present example, the control 924 comprises a scroll wheel as described above and controls 922 and 923 comprise binary buttons as described above. The control 922 may comprise linear forward speed control, the control 923 may a comprise linear backward speed control, and the control 924 may comprise a linear position control. Each of controls 922, 923 and 924 is positioned for manipulation by a digit (e.g., index finger) of a user's right hand.

The control 926 is integrated with the surface 925 and may comprise a scroll wheel. The control 926 may comprise a rotational position control. The rotational axis of the control 926 may be positioned to allow rotation in response to dragging a user's right thumb in left-to-right and right-to-left motions across a surface of the control 926. This manipulation of the control 926 by the user's right thumb may occur simultaneously with manipulation of controls 922, 923 or 924 by another digit of the user's right hand.

The right control housing 920 of input system 900 does not include an EMD selection control. Accordingly, the controls of right control housing 920 may be dedicated to controlling linear and rotational motion of a single EMD during operation, such as a guidewire. This dedicated EMD may be selectable by control computing system 34 or other control elements of the robotic drive 24.

Control 927 may provide momentary activation of a function such as the above-described turbo mode. It would be difficult to accurately manipulate control 926 during activation of control 927 with the user's right thumb, so such a turbo mode would apply only to linear movement controlled using controls 922, 923 and/or 924. Moreover, turbo mode may be best suited for scenarios during which rotation is not needed, such as when linearly moving a guidewire within another catheter.

The left control housing 930 includes a side surface 931 and a top surface 935. Surfaces 931 and 935 may be curved or shaped to support portions of a user's left hand as shown in FIG. 9B.

Controls 932, 933 and 934 are integrated with the first surface 931 according to some embodiments. The control 934 comprises a scroll wheel as a linear position control and controls 932 and 933 comprise binary buttons as linear speed controls as described above. Each of controls 932, 933 and 934 is positioned for manipulation by a digit (e.g., index finger) of a user's left hand.

The control 936 is integrated with the surface 935 and may comprise a scroll wheel as a rotational position control. The control 936 may be positioned for manipulation by the user's left thumb as shown in FIG. 9B. Accordingly, left hand controls 932, 933, 934 and 936 are analogous to right hand controls 922, 923, 924 and 926. Unlike right hand controls 922, 923, 924 and 926, the EMD(s) whose movement is controlled by left hand controls 932, 933, 934 and 936 is selectable by the user via selection controls 937.

In particular, each of three controls 937 may be selected by the user's left thumb to select a corresponding EMD to control. Since control 936 can't easily be manipulated while depressing one or more of controls 937, each of controls 937 need only be depressed once to select a corresponding EMD to control. For example, to select two catheters, the user presses one of controls 937 with the left thumb, releases the selected control 937, then presses and releases another one of controls 937 with the left thumb. The thumb may now be moved to control 936 to control rotational movement of the two selected EMDs.

Control 938 functions as a "clear selection" control. The user may press and release control 938 with the left thumb to de-select all EMDs currently selected by controls 937. Such an arrangement facilitates a user's understanding of the state of the control system at a given time.

Figure 11:
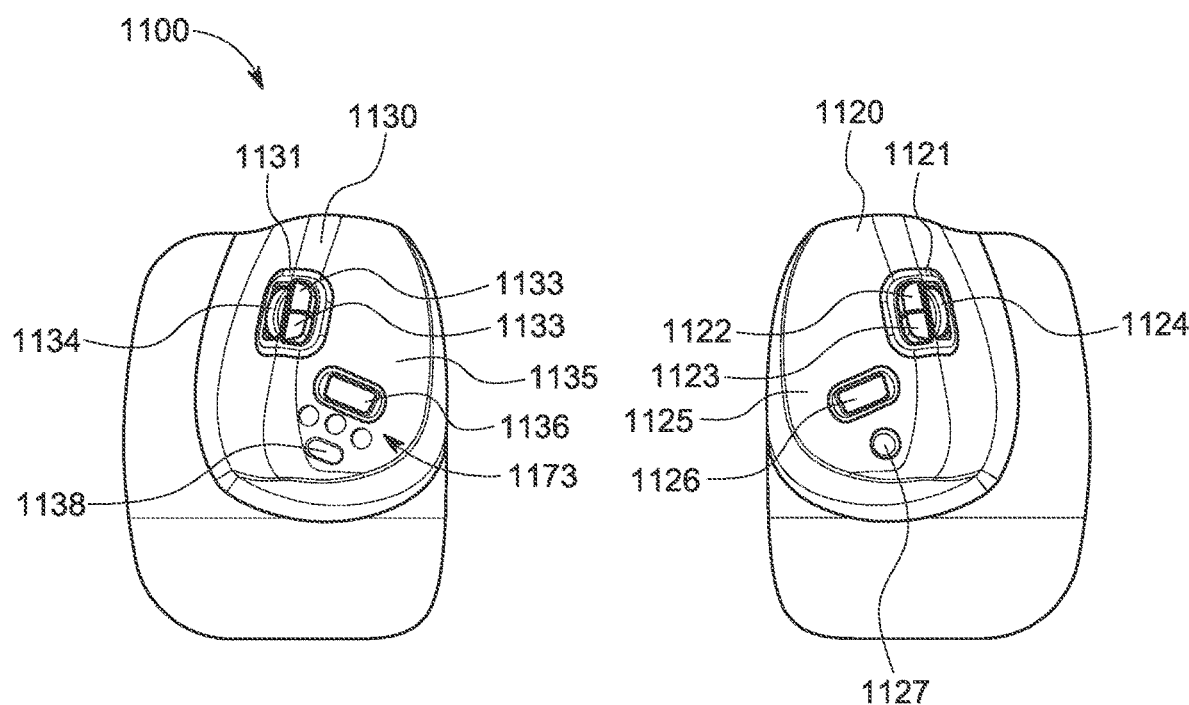
FIG. 11 is a perspective view of right and left control housings of an input system for a catheter-based procedure system in accordance with some embodiments.

FIG. 11 is a perspective view of a right control housing 1120 and a left control housing 1130 of an input system 1100 for a catheter-based procedure system in accordance with some embodiments. The controls of the input system 1100 are identical to those of the input system 900 described above, although physically arranged differently. Controls and components labeled 9xx in the illustrations of the input system 900 are labeled 11xx in the illustrations of the input system 1100 and similar explanations apply.

The right control housing 1120 and the left control housing 130 are not integrated within a single main housing. A user may therefore move the right control housing 1120 and/or the left control housing 1130 away or toward each other as desired, for ease of use, comfort or any other reason. Operation of the controls of the right control housing 1120 and the left control housing 130 may proceed similarly to that described with respect to input system 900.

Figure 12A:
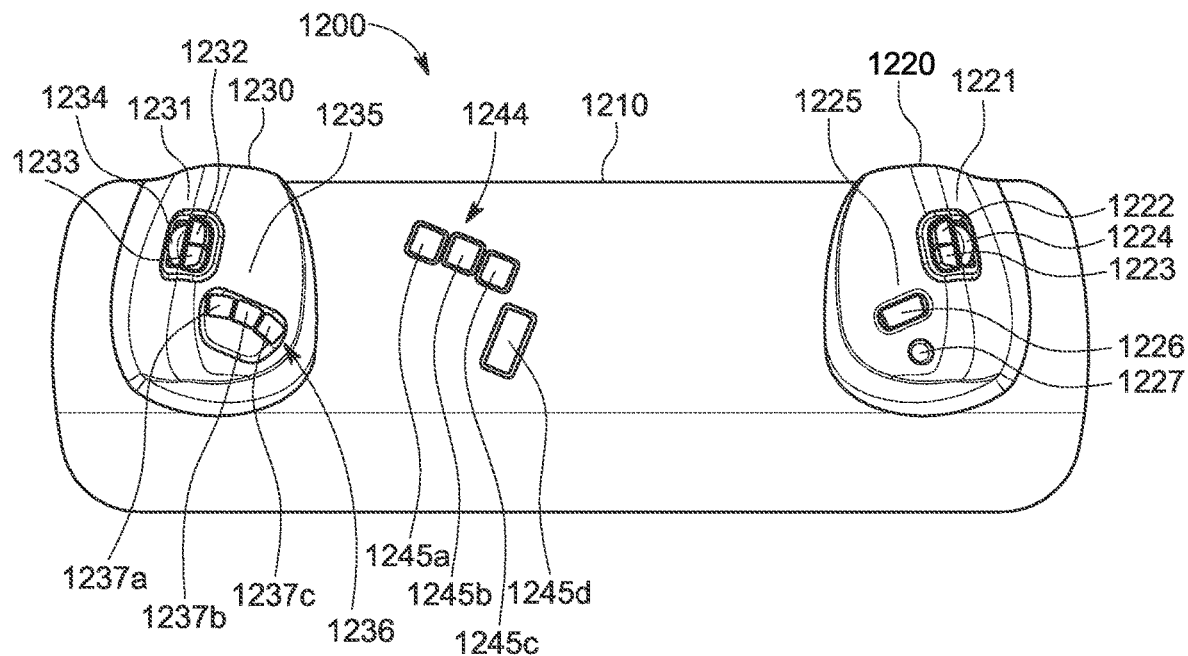
FIG. 12A is a perspective view of an input system for a catheter-based procedure system in accordance with some embodiments.
Figure 13A:
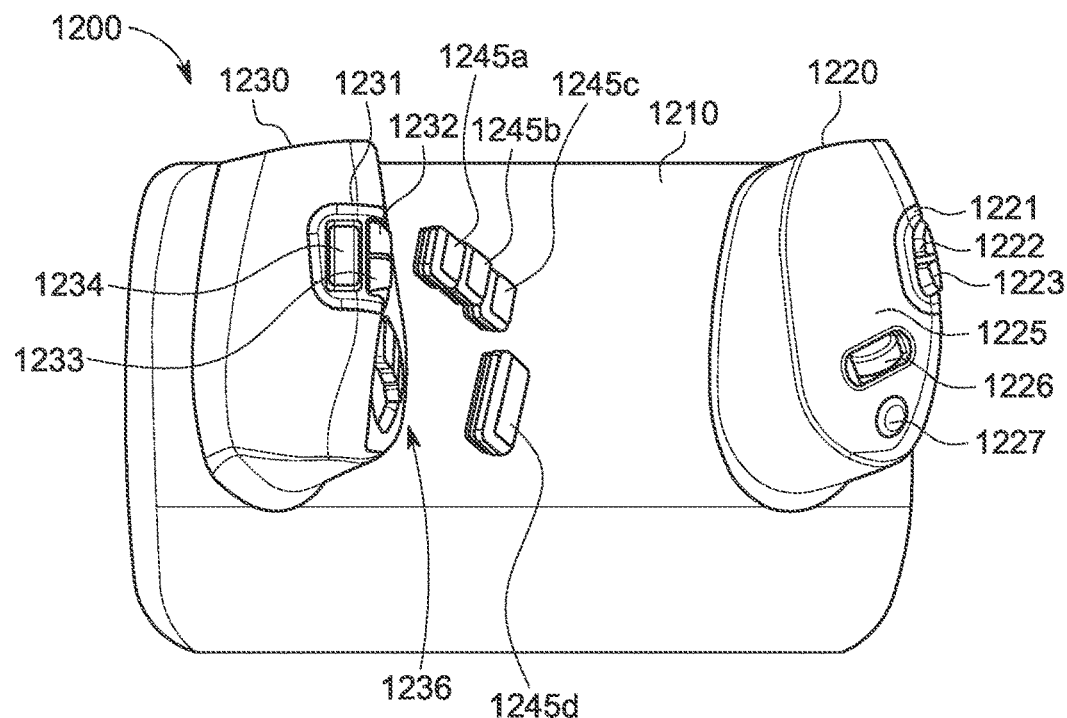
FIGS. 13A and 13B comprise right and left perspective views of an input system in accordance with some embodiments.
Figure 13B:
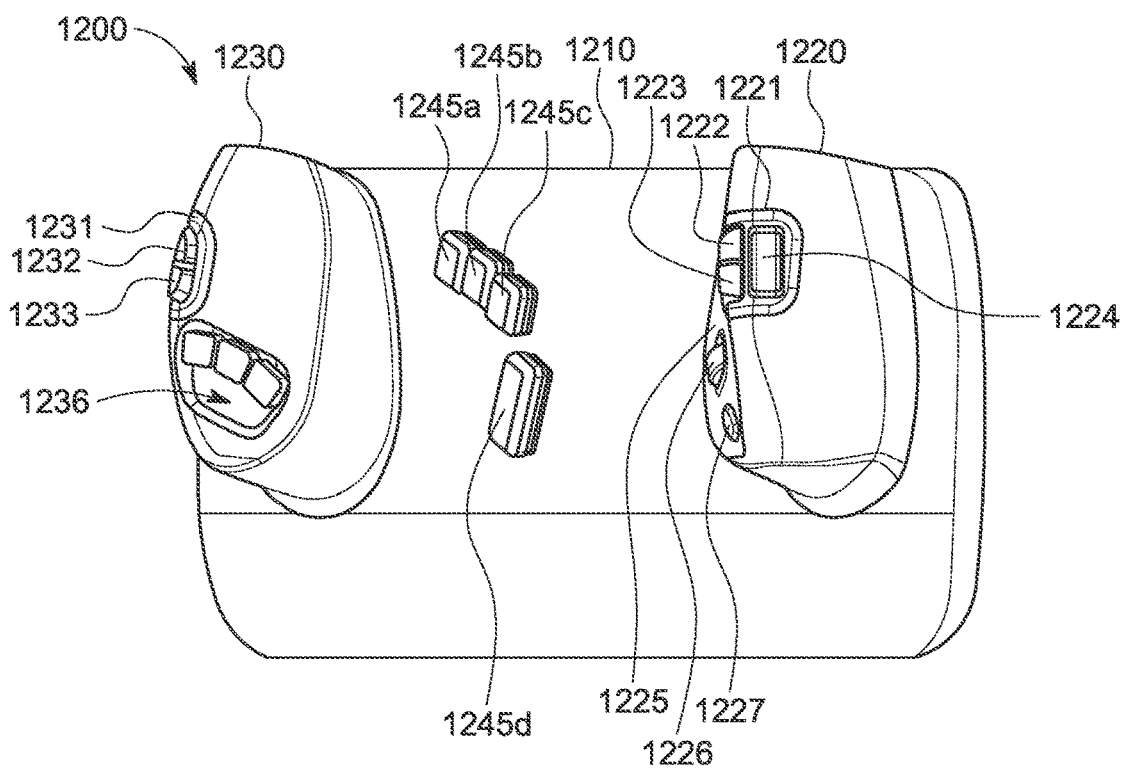

As shown in FIGS. 12A, 13A and 13B, input system 1200 comprises a right hand control housing 1220 similar to the right hand control housing 920 of input system 900, and a left hand control housing 1230 similar to the left hand control housing 430 of input system 400. Accordingly, elements of the right hand control housing 1220 may be assumed to behave similarly to similarly-numbered elements of the right hand control housing 920.

However, it was noted above that the EMD which is controlled by controls 922, 923, 924 and 926 of the input system 900 is not user-selectable using input system 900. In contrast, controls 1244 may be manipulated to select one or more EMDs whose linear motion may be controlled via user manipulation of controls 1222, 1223 and 1224 of the surface 1221, and whose rotational motion may be controlled via user manipulation of the control 1226.

Figure 12B:
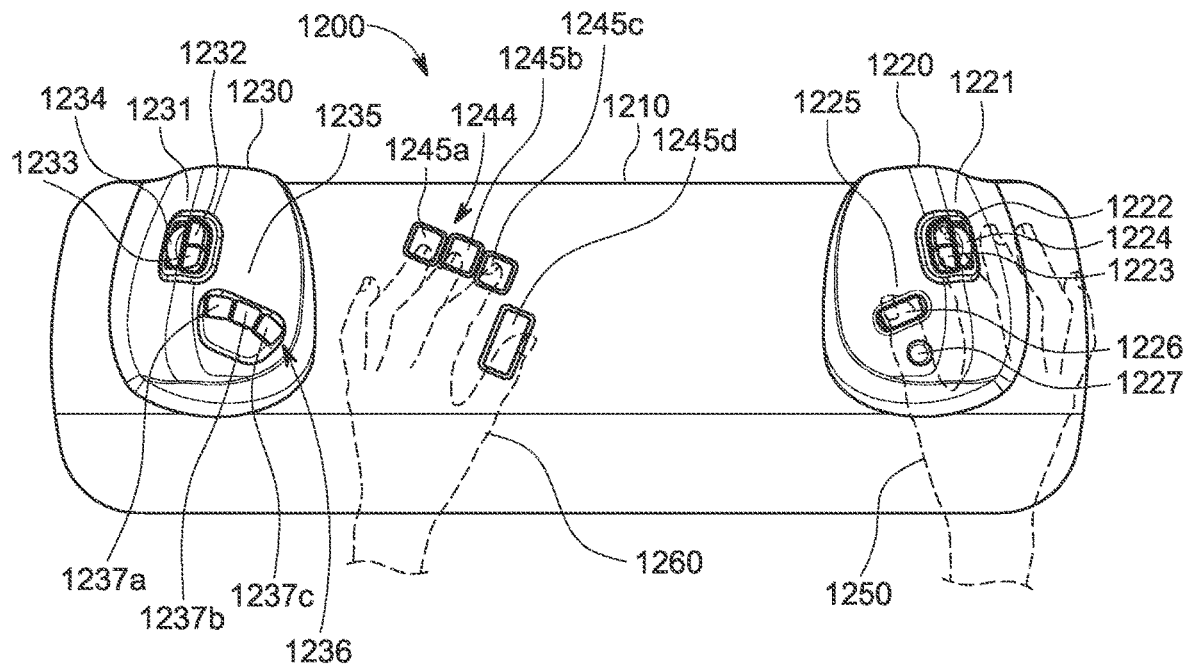
FIGS. 12B and 12C are perspective views of an input system for a catheter-based procedure system during operation in accordance with some embodiments.

FIG. 12B illustrates operation of the input system 1200 in the above manner. In particular, the left hand 1260 is positioned on/around controls 1244, with the thumb and first three digits positioned in rough correspondence with controls 1245*d*, 1245*a*, 1245*b*, and 1245*c*, respectively. According to some embodiments, the control 1245*d* corresponds to the guidewire and controls 1245*a*, 1245*b*, and 1245*c* correspond to EMDs loaded in positions 1, 2, and 3, respectively. To select any combination of the four EMDs, the left hand 1260 is used to press and hold the corresponding ones of controls 1245*d*, 1245*c*, 1245*b*, and 1245*a*. Rotational and linear movement of the selected EMDs may then be controlled as described above using the thumb of the right hand 1250 to manipulate the control 1226 and another digit of the right hand 1250 to manipulate one of controls 1222, 1223 and 1224.

Figure 12C:
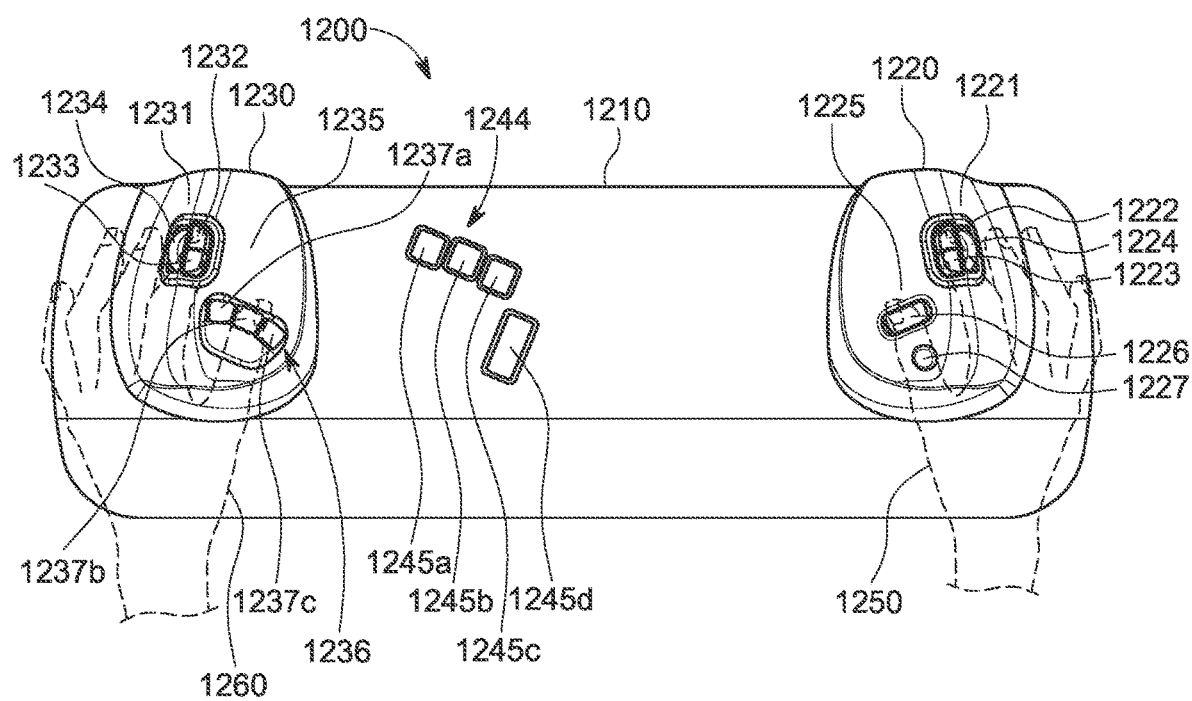

FIG. 12C illustrates movement of the left hand 1260 to the left control housing 120, while the right hand 1250 maintains its position on the right control housing 1220. The left hand 1260 may manipulate the controls of the left control housing 120 as described above with respect to the left control housing 430 of the input system 400. In particular, the left thumb depresses one of controls 1237a, 1237b and 1237c to select a corresponding (non-guidewire) EMD, and the left index finger manipulates controls 1232, 1233 and 1234 to instruct the robotic drive 24 to control linear movement of the selected EMD. On the right control housing 1220, the right thumb presses and holds control 1227 to activate the guidewire, at which point the right index finger manipulates controls 1222, 1223 and 1224 to instruct the robotic drive 24 to control linear movement of the guidewire.

The input system 1200 may therefore be useful, for example, to optionally control two degrees of freedom of an EMD (i.e., FIG. 12B) or one degree of freedom of each of two different EMDs (i.e., FIG. 12C). In view of the ability to select a set of one or more EMDs to correspond to the controls of one hand, the FIG. 12B operation may control two degrees of freedom of each of a set of one or more EMDs, while the FIG. 12C operation illustrates control of a single degree of freedom of each of two different sets of one or more EMDs.

Figure 14:
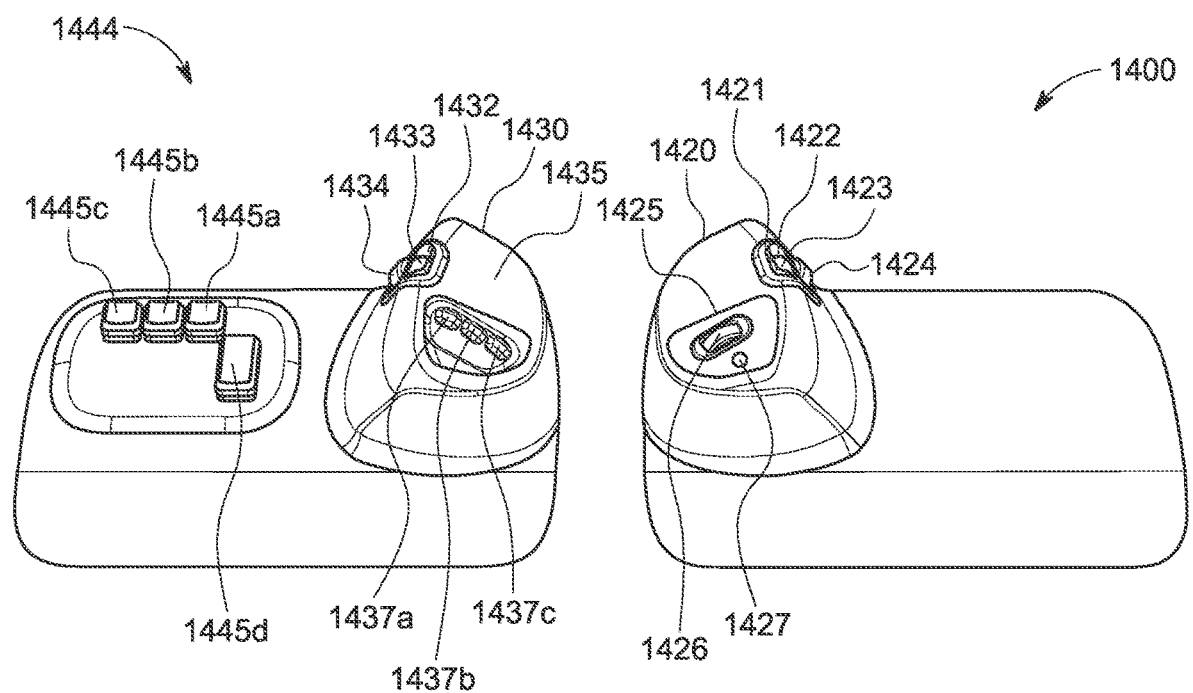
FIG. 14 is a perspective view of right and left control housings of an input system for a catheter-based procedure system in accordance with some embodiments.

FIG. 14 is a perspective view of a right control housing 1420 and a left control housing 1430 of an input system 1400 for a catheter-based procedure system in accordance with some embodiments. The controls of the input system 1400 are identical to those of the input system 1200 described above, although physically arranged differently, and may operate similarly. Accordingly, controls and components labeled 12xx in the illustrations of the input system 1200 are labeled 14xx in the illustrations of the input system 1400 and similar explanations are applicable.

The right control housing 1420 and the left control housing 1430 are physically separate. Accordingly, a user may independently move the right control housing 1420 and/or the left control housing 1430. Selection controls 1444 are shown disposed to the left of the left control housing 1430, in contrast to the position of selection controls 1244 with respect to left control housing 1230.

In one example of operation, the left hand of a user is positioned on the left control housing 830 to depress and hold selected ones of selection controls 1444. The user's right hand is positioned such that the thumb rests on the scroll wheel 1426 of the surface 1425 of the right control housing 1420, and the index finger rests on/around controls 1422, 1423 and 1424 of the surface 1421. The right thumb manipulates the control 1426 to rotate the one or more EMDs corresponding to the selected selection controls 1444, and the right index finger may simultaneously manipulate one of controls 1422, 1423 and 1424 to instruct the robotic drive 24 to control linear motion of the selected EMDs.

The left hand of the user may also move to the left control housing 830 such that the left thumb selects one of controls 1437a, 1437b and 1437c. The left index finger rests on/around controls 1432, 1433 and 1434 of the surface 1431 and manipulates controls 1432, 1433 and 434 with the left finger to instruct the robotic drive 24 to control linear motion of the selected EMDs. While the left thumb is selecting an EMD, the right thumb may depress and hold the control 1427 to activate the guidewire and, while holding the control 1427, the right index finger may manipulate controls 1422, 1423 and 1424 to instruct the robotic drive 24 to control linear motion of the guidewire.

Any of the above-described input controls, when used in a position control mode, can instruct the robotic drive 24 to actuate an EMD by a prescribed increment when the input control is activated. When controlling axial movement in a position control mode, an input control can command at least one device module 32 to move a discrete distance in the distal or proximal direction. When controlling the rotational movement of an EMD in a position control mode, an input control can command a device module 32 to rotate the EMD a discrete angle in the clockwise or counterclockwise direction. When a position motion command is issued in a closed-loop system, the control computing system 34 can compare the commanded increment or position with a measured increment or position. If the commanded value is different than the measured value, the control computing system 34 can close the loop by providing an additional motion command to correct the difference.

When used in a speed control mode, any of the above-described input controls can instruct the robotic drive 24 to continuously actuate an EMD at a prescribed rate while the input control is activated by the user. When controlling axial movement, an input control in speed control mode can command at least one device module 32 to move in the distal or proximal direction continuously at the prescribed rate until the user deactivates the input control (or a limit of the robotic drive 24 is reached). Similarly, an input control in speed control mode can command at least one device module 32 to continuously rotate at the prescribed rate as long as the input control is activated. When a speed motion command is issued in a closed-loop system, the control computing system 34 compares the commanded speed with the measured speed and, if a difference is detected, adjust the movement speed to close the loop.

In some operating modes, the relationship between the binary, analog, and scrolling input controls and the increment of commanded axial movement or rotation of an EMD may be fixed. When operating in such a mode, the value of the prescribed increments and the prescribed rates for position controls and speed controls, respectively, may be fixed for an input control. In other modes of operation, however, the relationship between the binary, analog, and scrolling input controls and the amount of commanded axial movement or rotation of an EMD may be configurable by the user or by the control computing system 34.

According to some embodiments, scaling input controls are provided and may be activated by the user to increase or decrease the prescribed rate and prescribed increments of the associated input control(s) by a predetermined value. Additionally or alternatively, the prescribed increment or rate of an input control may be increased or decreased based on a scaling factor each time a corresponding scaling inputs is pressed.

In some embodiments, an input system can be configured with selection verification features that require a user to confirm that the desired EMD and/or device module 32 has been selected before any motion commands are sent to the robotic drive 24.

According to some embodiments, the robotic system is configured so that the input controls instructing motion of a guidewire are mapped to the device module holding the guidewire. The identity of the device module holding the guidewire may be detected with sensors in response to loading the guidewire into the device module. Detection may employ contact or non-contact sensors, such as mechanical, electrical or visual sensors, or by a user input prompted by the system.

In some embodiments, a GUI may also provide a graphical representation of the input system 28 and the input controls on input system (for example, the buttons, scroll wheels, knobs, joysticks, or any other input controls) using an input map (not illustrated). As the input controls are manipulated by the user, the button map can indicate which input controls are being activated. This may be useful so that the user may see which input controls are being manipulated without looking at the input system 28. For example, the button map can include an array of icons corresponding to each or the input controls, which may be arranged on screen in a pattern that is similar to the physical arrangement of the input controls on the input system 28. Each icon can be configured to light up and/or be animated when manipulated by the user. For binary input controls, corresponding icon on the button may indicate whether the input control is in an activated (pressed) or inactivate (unpressed) state. The icons corresponding to analog input controls may indicate a degree of manipulation.

In addition to visual feedback, the control station 26 may be configured to provide physical feedback to the user. For example, feedback may be provided in the form of at least one of vibration, cogging, and a resistance or counteracting force. In some embodiments, vibration feedback may be used to provide various alerts. The vibrations may be provided at on preset, constant intensity, or the intensity may vary based of different levels of the alerts. For example, the intensity of vibrations may increase as a measured load approaches a maximum load limit. Alternatively, different intensities or vibration patterns may be to differentiate between different alerts. Cogging feedback refers to the sensation of incremental bumps or clicks that give the user a sensation of a control mechanism traveling. In some embodiments, this may be similar to the tactile feedback provided by a scrolling input control as it is rotated between positions created by its detents. Some systems, however, can use at least one different sensation for cogging feedback. The type and intensity of the cogging sensation may be fixed, or it may be adjustable by the user or by the system.

Physical feedback may be by physical interactions between components that occur as the user manipulates the input system 28, or it can be simulated using electromechanical devices. For example, a motor can be controlled to provide a tapping sensation as cogging feedback. When physical feedback is provided through an input system 28, the feedback may be felt throughout the input system, it may be provided near (or appear to originate from) an area located close to specific input controls. For example, vibration feedback can be provided by a motor (or any other device) that is near an input control to indicate alerts associated with that input control.

Computer-executable program code for controlling a catheter-based procedure system according to methods using any of the above-described components may be stored on non-transitory computer readable media. Computer readable media includes volatile and nonvolatile, removable, and non-removable media implemented in any method or technology for storage of information such as computer readable instructions, data structures, program modules or other data. Computer readable media includes, but is not limited to, random access memory (RAM), read-only memory (ROM), electrically erasable programmable ROM (EEPROM), flash memory or other memory technology, compact disk ROM (CD-ROM), digital versatile disks (DVD) or other optical storage, magnetic cassettes, magnetic tape, magnetic disk storage or other magnetic storage devices, or any other medium which can be used to store the desired instructions and which may be accessed by system 10 (shown in FIG. 1), including by internet or other computer network form of access.

Embodiments may include other examples that occur to those in the art. Such other examples are intended to be within the scope of the claims if they have structural elements that do not differ from the literal language of the claims, or if they include equivalent structural elements with insubstantial differences from the literal language of the claims. The order and sequence of any process or method steps may be varied or re-sequenced according to alternative embodiments.

Many other changes and modifications may be made to the embodiments described herein. The scope of these and other changes will become apparent from the appended claims.

We claim:

1. A system for controlling a robotic drive configured to move one or more elongated medical devices, the system comprising:
    a housing comprising a first surface and a second surface not co-planar with the first surface;
    a first control integrated with the first surface and manipulable by a first digit of a first hand of a user to select one of the one or more elongated medical devices;
    a second control integrated with the second surface and manipulable by a second digit of the first hand of the user to instruct the robotic drive to move the selected elongated medical device in a first degree of freedom;
    a second housing comprising a third surface not co-planar with the first surface or the second surface and a fourth surface not co-planar with the first surface, the second surface, or the third surface;
    a third control integrated with the third surface and manipulable by a first digit of a second hand of the user to select a second one of the one or more elongated medical devices; and
    a fourth control integrated the fourth surface and manipulable by a second digit of the second hand to instruct the robotic drive to move the second elongated medical device in the first degree of freedom,
    wherein the first control and the second control are simultaneously manipulable by the first digit and the second digit of the first hand, and
    wherein the third control and the fourth control are simultaneously manipulable by the first digit and the second digit of the second hand.

2. The system according to claim 1, wherein the second control is manipulable by the second digit of the first hand of the user to instruct the robotic drive to control a speed of the selected elongated medical device in the first degree of freedom, the system further comprising:
    a fifth control integrated with the second surface and manipulable by the second digit of the first hand to instruct the robotic drive to control a position of the selected elongated medical device in the first degree of freedom.

3. The system according to claim 2, the system further comprising:
    a sixth control integrated with the first surface and manipulable by the first digit of the first hand to select a third one of the one or more elongated medical devices.

4. The system according to claim 3, the system further comprising:
a seventh control integrated with the first surface and manipulable by the first digit of the first hand to select a fourth one of the one or more elongated medical devices,
wherein the third elongated medical device is a guidewire, and
wherein the seventh control is larger than the first control and the sixth control.

5. The system according to claim 4, wherein the first digit is a thumb of the first hand and wherein the second control and the third control are configured to instruct the robotic drive only if at least one of the first, sixth and seventh controls is being manipulated by the user.

6. The system according to claim 4, wherein at least two of the first, sixth and seventh controls may be simultaneously manipulated by the first digit of the first hand to select at least two of the first elongated medical device, the third elongated medical device and the guidewire.

7. The system according to claim 1, wherein the first degree of freedom is linear, the system further comprising:
a fifth control integrated with the housing and manipulable by the second hand of the user to instruct the robotic drive to rotate the selected elongated medical device.

8. The system according to claim 7, wherein the second control is manipulable by the second digit of the first hand of the user to instruct the robotic drive to control a linear speed of the selected elongated medical device, the system further comprising:
a sixth control integrated with the second surface and manipulable by the second digit of the first hand to instruct the robotic drive to control a linear position of the selected elongated medical device.

9. The system according to claim 8, the system further comprising:
a seventh control integrated with the first surface and manipulable by the first digit of the first hand to select a third one of the one or more elongated medical devices; and
an eighth control integrated with the first surface and manipulable by the first digit of the first hand to select a fourth one of the one or more elongated medical devices,
wherein the fourth elongated medical device is a guidewire, and
wherein the eighth control is larger than the first control and the seventh control.

10. The system according to claim 9, wherein the fourth control is manipulable by the second digit of the second hand to instruct the robotic drive to control a linear speed of the second elongated medical device selected by the third control, the system further comprising:
a fifth control integrated with the fourth surface and manipulable by the second digit of the second hand to instruct the robotic drive to control a linear position of the second elongated medical device selected by the third control.

11. The system according to claim 10, the system further comprising:
a ninth control integrated with the third surface and manipulable by the first digit of the second hand to select one of the one or more elongated medical devices different from the elongated medical device selected by the third control; and
a tenth control integrated with the third surface and manipulable by the first digit of the second hand to select a guidewire of the one or more elongated medical devices,
wherein the tenth control is larger than the third control and the ninth control.

12. The system according to claim 11, wherein the first digit of the second hand is a thumb and wherein the fourth control and the fifth control are configured to instruct the robotic drive only if at least one of the third, ninth and tenth controls is being manipulated by the user.

13. The system according to claim 11, wherein at least two of the third, ninth and tenth controls may be simultaneously manipulated by the first digit of the second hand to select at least two elongated medical devices and the guidewire.

14. The system according to claim 1, the system further comprising:
a fifth control integrated with the first surface and manipulable by the first digit of the first hand to select a third one of the one or more elongated medical devices; and
a sixth control integrated with the first surface and manipulable by the first digit of the first hand to select a fourth one of the one or more elongated medical devices,
wherein the fourth elongated medical device is a guidewire, and
wherein the sixth control is larger than the first control and the fifth control.

15. The system according to claim 14, wherein the first digit is a thumb of the first hand and wherein the second control is configured to instruct the robotic drive only if at least one of the first, fifth and sixth controls is being manipulated by the user.

16. The system according to claim 14, wherein at least two of the first, fifth and sixth controls may be simultaneously manipulated by the first digit of the first hand to select at least two of the first elongated medical device, the third elongated medical device and the guidewire.

17. The system according to claim 1, the system further comprising:
a fifth control integrated with the third surface and manipulable by the first digit of the second hand to select a third one of the one or more elongated medical devices; and
a sixth control integrated with the third surface and manipulable by the first digit of the second hand to select a guidewire of the one or more elongated medical devices,
wherein the sixth control is larger than the third control and the fifth control.

18. The system according to claim 17, wherein the first digit of the second hand is a thumb and wherein the fourth control is configured to instruct the robotic drive only if at least one of the third, fifth and sixth controls is being manipulated by the user.

19. The system according to claim 17, wherein at least two of the third, fifth and sixth controls may be simultaneously manipulated by the first digit of the second hand to select at least two elongated medical devices and the guidewire.

20. A system for controlling a robotic drive configured to move one or more elongated medical devices, the system comprising:
a first control integrated with a first surface and manipulable by a first digit of a first hand to select one of the one or more elongated medical devices;

a second control integrated with a second surface not co-planar with the first surface and manipulable by a second digit of the first hand to instruct the robotic drive to move the selected elongated medical device in a first degree of freedom;

a third control integrated with a third surface not co-planar with the first surface or the second surface and manipulable by a first digit of a second hand to select a second one of the one or more elongated medical devices; and a fourth control integrated with a fourth surface not co-planar with the first surface, the second surface or the third surface and manipulable by a second digit of the second hand to instruct the robotic drive to move the second elongated medical device in the first degree of freedom, wherein the first control and the second control are simultaneously manipulable by the first digit and the second digit of the first hand, and wherein the third control and the fourth control are simultaneously manipulable by the first digit and the second digit of the second hand.

21. The system according to claim 20, further comprising:
a fifth control integrated with the first surface and manipulable by the first digit of the first hand to select a third one of the one or more elongated medical devices,
wherein the third elongated medical device is a guidewire, and
wherein the fifth control is larger than the first control.

22. The system according to claim 21, wherein the first degree of freedom is linear, the system further comprising:
a sixth control manipulable by the second hand to instruct the robotic drive to rotate the selected elongated medical device.

23. The system according to claim 20, wherein the second control is manipulable by the second digit of the first hand of the user to instruct the robotic drive to control a linear speed of the selected elongated medical device, the system further comprising:
a fifth control integrated with the second surface and manipulable by the second digit of the first hand to instruct the robotic drive to control a linear position of the selected elongated medical device.

24. The system according to claim 20, the system further comprising:
a fifth control integrated with the first surface and manipulable by the first digit of the first hand to select a third one of the one or more elongated medical devices; and
a sixth control integrated with the first surface and manipulable by the first digit of the first hand to select a fourth one of the one or more elongated medical devices,
wherein the fourth elongated medical device is a guidewire, and
wherein the sixth control is larger than the first control and the fifth control.

25. The system according to claim 24, wherein the fourth control is manipulable by the second digit of the second hand to instruct the robotic drive to control a linear speed of the second elongated medical device selected by the third control, the system further comprising:
a seventh control integrated with the fourth surface and manipulable by the second digit of the second hand to instruct the robotic drive to control a linear position of the second elongated medical device selected by the third control.

26. The system according to claim 24, the system further comprising:
a seventh control integrated with the third surface and manipulable by the first digit of the second hand to select one of the one or more elongated medical devices different from the second elongated medical device selected by the third control; and
an eighth control integrated with the third surface and manipulable by the first digit of the second hand to select a guidewire of the one or more elongated medical devices,
wherein the eighth control is larger than the third control and the seventh control.

27. The system according to claim 24, wherein the first digit is a thumb of the first hand and wherein the second control is configured to instruct the robotic drive only if at least one of the first, fifth and sixth controls is being manipulated by the user.

28. The system according to claim 27, wherein at least two of the first, fifth and sixth controls may be simultaneously manipulated by the first digit of the first hand to select at least two of the first elongated medical device, the third elongated medical device and the guidewire.

29. The system according to claim 21, wherein the first digit is a thumb of the first hand and wherein the second control is configured to instruct the robotic drive only if at least one of the first and fifth controls is being manipulated by the user.

30. A system for controlling a robotic drive, the system comprising:
a first control manipulable by a first digit of a first hand to select one of one or more elongated medical devices;
a second control manipulable by a second digit of the first hand to instruct the robotic drive to move the selected elongated medical device in a first degree of freedom;
a third control manipulable by a first digit of a second hand to select a second one of the one or more elongated medical devices; and
a fourth control manipulable by a second digit of the second hand to instruct the robotic drive to move the second elongated medical device in the first degree of freedom,
wherein the first control and the second control are simultaneously manipulable by the first digit and the second digit of the first hand, and
wherein the third control and the fourth control are simultaneously manipulable by the first digit and the second digit of the second hand.

31. The system according to claim 30, further comprising:
a fifth control manipulable by the first digit of the first hand to select a third one of the one or more elongated medical devices,
wherein the third elongated medical device is a guidewire, and
wherein the fifth control is larger than the first control.

32. The system according to claim 31, wherein the first degree of freedom is linear, the system further comprising:
a sixth control manipulable by the second hand to instruct the robotic drive to rotate the selected elongated medical device.

33. The system according to claim 30, wherein the second control is manipulable by the second digit of the first hand of the user to instruct the robotic drive to control a linear speed of the selected elongated medical device, the system further comprising:

a fifth control manipulable by the second digit of the first hand to instruct the robotic drive to control a linear position of the selected elongated medical device.

34. The system according to claim 30, the system further comprising:
a fifth control manipulable by the first digit of the first hand to select a third one of the one or more elongated medical devices; and
a sixth control manipulable by the first digit of the first hand to select a fourth one of the one or more elongated medical devices,
wherein the fourth elongated medical device is a guidewire, and
wherein the sixth control is larger than the first control and the fifth control.

35. The system according to claim 34, wherein the fourth control is manipulable by the second digit of the second hand to instruct the robotic drive to control a linear speed of the second elongated medical device selected by the third control, the system further comprising:
a seventh control manipulable by the second digit of the second hand to instruct the robotic drive to control a linear position of the second elongated medical device selected by the third control.

36. The system according to claim 34, the system further comprising:
a seventh control manipulable by the first digit of the second hand to select one of the one or more elongated medical devices different from the second elongated medical device selected by the third control; and
an eighth control manipulable by the first digit of the second hand to select a guidewire of the one or more elongated medical devices,
wherein the eighth control is larger than the third control and the seventh control.

37. The system according to claim 34, wherein the first digit is a thumb of the first hand and wherein the second control is configured to instruct the robotic drive only if at least one of the first, fifth and sixth controls is being manipulated by the user.

38. The system according to claim 37, wherein at least two of the first, fifth and sixth controls may be simultaneously manipulated by the first digit of the first hand to select at least two of the first elongated medical device, the third elongated medical device and the guidewire.

39. The system according to claim 31, wherein the first digit is a thumb of the first hand and wherein the second control is configured to instruct the robotic drive only if at least one of the first and fifth controls is being manipulated by the user.

40. The system according to claim 39, wherein the first and fifth controls may be simultaneously manipulated by the first digit of the first hand to select the first elongated medical device and the guidewire.

* * * * *